United States Patent [19]
Winbow

[11] Patent Number: 5,418,335
[45] Date of Patent: * May 23, 1995

[54] SYNCHRONIZED ACOUSTIC SOURCE
[75] Inventor: Graham A. Winbow, Houston, Tex.
[73] Assignee: Exxon Production Research Company, Houston, Tex.
[*] Notice: The portion of the term of this patent subsequent to Dec. 6, 2011 has been disclaimed.
[21] Appl. No.: 279,971
[22] Filed: Jul. 25, 1994

Related U.S. Application Data

[63] Continuation-in-part of Ser. No. 103,934, Aug. 6, 1993, Pat. No. 5,371,330.
[51] Int. Cl.$^6$ .............................................. G01V 1/40
[52] U.S. Cl. ................................... 181/106; 181/113; 181/401; 367/25; 166/177
[58] Field of Search ............... 181/106, 113, 401, 119; 367/25, 31, 83, 911, 912; 166/177, 249

[56] References Cited

U.S. PATENT DOCUMENTS

| | | | |
|---|---|---|---|
| 2,064,451 | 12/1936 | Voorhees | 181/0.5 |
| 2,156,624 | 5/1939 | Faust | 181/0.5 |
| 2,908,342 | 10/1959 | Itria et al. | 181/0.5 |
| 2,953,214 | 9/1960 | Merten | 181/0.5 |
| 3,442,120 | 5/1969 | Russenberger et al. | 73/92 |
| 4,214,226 | 7/1980 | Narasimhan et al. | 367/27 |
| 4,497,044 | 1/1985 | Silverman | 367/41 |
| 4,525,645 | 6/1985 | Shirley et al. | 310/337 |
| 4,671,379 | 6/1987 | Kennedy et al. | 181/106 |
| 4,682,308 | 7/1987 | Chung | 367/31 |
| 4,751,688 | 6/1988 | Paulsson | 367/36 |
| 4,783,771 | 11/1988 | Paulsson | 367/57 |
| 4,834,210 | 5/1989 | Kennedy | 181/106 |
| 4,856,614 | 8/1989 | Arens et al. | 181/104 |
| 4,869,338 | 9/1989 | Wiggins et al. | 181/106 |
| 4,955,952 | 11/1990 | Williams et al. | 181/111 |
| 4,993,001 | 2/1991 | Winbow et al. | 367/144 |
| 4,996,674 | 2/1991 | Thompson | 367/158 |
| 5,111,437 | 5/1992 | Rice | 367/57 |
| 5,268,537 | 12/1993 | Winbow et al. | 181/106 |

OTHER PUBLICATIONS

"Borehole Stresses Created by Downhole Seismic Sources", Geophysics, vol. 56, No. 7 (Jul. 1991); pp. 1055–1057.
"Seismic Sources in Open and Cased Boreholes", Geophysics, vol. 56, No. 7 (Jul. 1991); pp. 1040–1050.
"Experimental Studies on Downhole Seismic Sources", Geophysics, vol. 55, No. 12 (Dec. 1990); pp. 1645–1651.
Classical Electrodynamics, 2nd Edition, 1975, by J. D. Jackson, John Wiley, pp. 241–244.
McGraw-Hill Encyclopedia of Science & Technology, 7th Edition: (1) "Acoustic Impedance", vol. 1, p. 68; (2) Electrical Impedance, vol. 6, p. 93; (3) Inductance Measurement, vol. 9, pp. 88–89; (4) Reactance, vol. 15, pp. 196–197; (5) Wave Motion, vol. 19, pp. 361–365; (6) Servomechanism, vol. 19, pp. 295–302.
U.S. Patent Application 08/218,127, filed Mar. 25, 1994; "Mass Oscillator Having an Adjustable Gas Spring", by M. M. Gram.
Waves in fluids, Cambridge University Press, 1978, by James Lighthill, p. 135.

Primary Examiner—J. Woodrow Eldred
Attorney, Agent, or Firm—K. D. Van Tassell

[57] ABSTRACT

The current invention is an apparatus useful for generating seismic waves with an enhanced signal to noise ratio. The enhanced signal is produced at a fundamental resonant frequency, and multiples thereof, by producing a near zero acoustic pressure condition around and beyond each end of the apparatus having an intermediate acoustic source. Such a near zero acoustic pressure condition is established preferably by either (1) using two end acoustic sources to produce a destructive interference effect with the acoustic output of a third acoustic source postioned therebetween, or (2) using two active or passive end acoustic capacitors or resonators to produce a near zero impedance condition at each end of the apparatus. The enhanced signal may be produced over a range of frequencies, including both resonant and nonresonant frequencies, by creating a high impedance condition experienced by the intermediate source and hence a high acoustic pressure around the intermediate region of the apparatus. Preferably this high impedance condition is generated using one or more internal acoustic capacitors or resonators, with each being positioned between the intermediate acoustic source and an end acoustic source or capacitor or resonator, respectively. The apparatus can maintain the high impedance or resonant condition up to a frequency which is about two times the resonance frequency between the intermediate source and each internal acoustic capacitor.

7 Claims, 12 Drawing Sheets

Angle θ Expressed in Terms of π

Angle θ Expressed in Terms of π

SYNCHRONIZED ACOUSTIC SOURCE

RELATED APPLICATION

This application is a continuation-in-part application of application Ser. No. 08/103,934, now U.S. Pat. No. 5,371,330, filed on Aug. 6, 1993.

BACKGROUND OF INVENTION

1. Field of Invention

This invention relates to apparatuses for generating seismic waves and more particularly for generating seismic waves below the surface of the earth in a formation surrounding a borehole.

2. Description of the Prior Art

In exploring for oil, gas, and other mineral deposits in subsurface earth formations, seismic waves, (i.e., body waves or P- and S-waves), are used to map subsurface geologic structures and stratigraphic features. Seismic waves might also be useful for facilitating the production of oil and gas where such waves are used to vibrate an oil or gas bearing formation, thereby enhancing the movement of oil or gas in the formation (e.g., see U.S. Pat. No. 3,952,800).

Several typical types of seismic exploration techniques which use one or more boreholes include vertical seismic profiling (VSP), reverse vertical seismic profiling (RVSP), and crosswell seismic profiling. In the case of VSP, seismic energy sources such as explosive charges, surface vibrators, and other energy sources are placed on the surface of the earth and a plurality of seismic detector elements (geophones or hydrophones) are placed in a borehole. RVSP involves placing an array of geophones over the surface of the earth, while the energy sources such as explosives, vibrators, or pneumatic guns are placed in the borehole for generating an acoustic signal. Crosswell seismic profiling involves placing an array of geophones or hydrophones in one borehole and the energy sources in a neighboring borehole. In each of these techniques, the acoustic signals produced by the energy sources penetrate the formation surrounding the borehole(s) and are reflected by the subsurface strata to the geophones located either on the surface or in a neighboring borehole. Also, geophones or hydrophones can be placed in the well containing the source (i.e., the source well) to detect, for example, reflected energy from bodies, such as salt domes, adjacent to the borehole. Such imaging may be referred to as single well (reflection) profiling.

The reflected acoustic signals provide geologists and geophysicists acoustic images of the subsurface formations. Such acoustic images of the subsurface strata, and in particular of oil and gas reservoirs, can be constructed by a variety of techniques known as reflection seismic or tomographic imaging. Reflection seismic images the interfaces between different formations, while tomographic imaging provides information about formation velocities which can be used to help identify the presence of oil, gas, or mineral deposits.

A problem arises, though, where seismic information is needed over extended distances in the earth. Currently, no commercially available downhole seismic source has a horizontal range reliably exceeding 1500 feet. Typical wells in the most productive oil fields, however, are at least 3000 feet apart. Therefore, current downhole seismic source apparatuses are applicable to only a small percentage of oil fields with closely spaced wells.

Most downhole seismic sources operate unreliably at ranges over 1500 feet because the signal (comprised of P- and S-waves) to background noise ratio is low, which in turn provides poor quality acoustic images for characterizing the formation structure. The principal reason for obtaining a low signal to noise ratio is that most of the energy produced by a downhole acoustic source typically causes the propagation of tube waves in the liquid filled borehole, rather than producing the desired P- and S- waves.

Tube waves are propagated through a liquid contained in a borehole casing when a pressure pulse from an acoustic source is generated in the liquid. Most of the tube waves' energy propagates through the liquid as they move along a borehole. Tube waves are damped to a certain extent by liquid-solid frictional forces, but generally, the damping affect of such forces on tube waves is only slight. Tube waves, therefore, usually travel substantial distances through a liquid filled casing at a relatively constant velocity with little attenuation to their amplitude. Because of the existence of and efficient propagation of tube waves we can say that a borehole is an efficient acoustic waveguide. A downhole seismic source which is placed in such a waveguide directs most of its energy into creating guided waves (i.e., tube waves) rather than body waves. This is a major disadvantage in terms of loss of energy to tube waves and subsequent noise created at any receivers placed around the well containing the seismic source.

One type of apparatus which attempts to improve the signal to noise ratio by producing a standing pressure wave and thereby preclude energy losses in tube wave formation is disclosed by Kennedy et al. in U.S. Pat. No. 4,671,379. Kennedy et al.'s apparatus oscillates the borehole liquid in a selected portion of the borehole to establish a resonant standing pressure wave of desired frequency within the fluid. The standing wave is contained within the selected portion of the borehole, however, by using two movable air bladders whose spatial separation is varied from about 15 to about 100 feet. This device, therefore, suffers from several practical defects. First, the bladders have to move substantial distances (e.g., up to about 50 feet) as the source sweeps the desired frequency range (e.g., 20–100 Hz) over a 45 second time period. Consequently, the device does not operate reliably because downhole moving parts are exposed to borehole drilling fluids containing abrasive particles and debris. Second, the bladders have to be pressurized with an air hose extending downhole from the surface which is inefficient and inconvenient from an operational perspective. Third, because the bladders cannot move very quickly, the device's minimum frequency range sweep is about 45 seconds. It is well known that for land surface vibration sources better data is usually generated by using a succession of shorter sweeps in the range of three to ten seconds per sweep.

Another type of apparatus which attempts to improve the signal to noise ratio is a downhole device for converting tube waves into body waves. This tube wave converting device is disclosed by Winbow et al. in U.S. Pat. No. 4,993,001. The device is a constricting obstacle placed downhole. As tube waves are forced to squeeze by the constriction, additional acoustic pressure is created on the borehole wall which leads to the formation of body waves. A disadvantage of this scheme, however, is that very high energy tube waves are required, which in turn leads to forming strong background noises as the tube waves enter the borehole and when they impact the end of the borehole.

Another downhole device related to that described in U.S. Pat. No. 4,993,001 is a broadband resonant wave downhole seismic source disclosed by Winbow et al. in U.S. Pat. No. 5,268,537. The device is used to partially or completely block off the borehole and create a fluid-filled borehole cavity. The fluid inside the cavity is oscillated to establish a standing pressure wave which is radiated through the wellbore into the surrounding formation. However, this device functions most effectively at high frequencies (i.e., greater than about 1,500 Hz). It is well known that lower frequencies (less than about 1000 Hz) are preferable for routine reflection seismic and tomographic imaging work.

Accordingly, there is a need for an efficient and reliable apparatus for producing an acoustic signal in a borehole having an increased ratio of P- and S-waves to background noises and thereby an enhanced signal to noise ratio.

SUMMARY OF INVENTION

According to the invention there is provided an apparatus for generating seismic waves in a borehole, said apparatus having first and second spaced-apart longitudinal ends, said apparatus comprising, a) at least one intermediate acoustic source having an input impedance for generating acoustic pressure waves in said borehole, each said acoustic pressure wave having a corresponding acoustic pressure amplitude and acoustic current, said intermediate source being positioned between said longitudinal ends; b) first and second end means positioned, respectively, at said first and second longitudinal ends and adapted for creating at least a partial acoustic pressure null proximate said first and second longitudinal ends, wherein at least one end means is passive; c) at least one internal acoustic capacitor between said longitudinal ends, each said internal acoustic capacitor having a variable internal capacitor input impedance; and d) means for synchronizing said intermediate source acoustic pressure waves with said internal capacitor input impedance so that said intermediate source input impedance is substantially maximized.

The inventive apparatus may further comprise means for synchronizing the operation of said intermediate acoustic source with the operation of said first and second end means so that said acoustic pressure amplitude of at least a portion of said intermediate source acoustic pressure waves is substantially nullified proximate said first and second longitudinal ends, whereby at least a portion of said intermediate source acoustic pressure waves is not propagated through said borehole beyond said longitudinal ends.

According to one embodiment of the invention each of said first and second end means is an end acoustic source for generating end source acoustic pressure waves which substantially destructively interfere with said intermediate source acoustic pressure waves thereby creating said partial acoustic pressure null.

According to an alternative embodiment of the invention each of said first and second end means is an end acoustic capacitor or resonator having either a variable capacitor or resonator input impedance (i.e., an active capacitor or resonator) or preset input impedance (i.e., a passive capacitor or resonator) for creating said partial acoustic pressure null.

According to another alternative embodiment of the invention said first end means is an end acoustic source for generating end source acoustic pressure waves which substantially destructively interfere with said intermediate source acoustic pressure waves thereby creating said partial acoustic pressure null proximate said first longitudinal end and said second end means is an end acoustic capacitor or resonator having a variable end capacitor or resonator input impedance for creating said partial acoustic pressure null proximate said second longitudinal end.

Other embodiments of the inventive apparatus include additional acoustic capacitors or resonators which permit the source to be operated effectively over a range of frequencies.

BRIEF DESCRIPTION OF THE DRAWINGS

In order to more fully understand the following detailed description of the present invention, reference should be made to the appended drawings. The appended drawings illustrate only one application and four embodiments of the inventive apparatus. These drawings are not to be considered limiting as the invention may admit to other equally effective embodiments and useful applications for a synchronized acoustic source. The following is a brief description of each drawing.

DESCRIPTION OF THE PREFERRED EMBODIMENT INTRODUCTION

Figure 1:
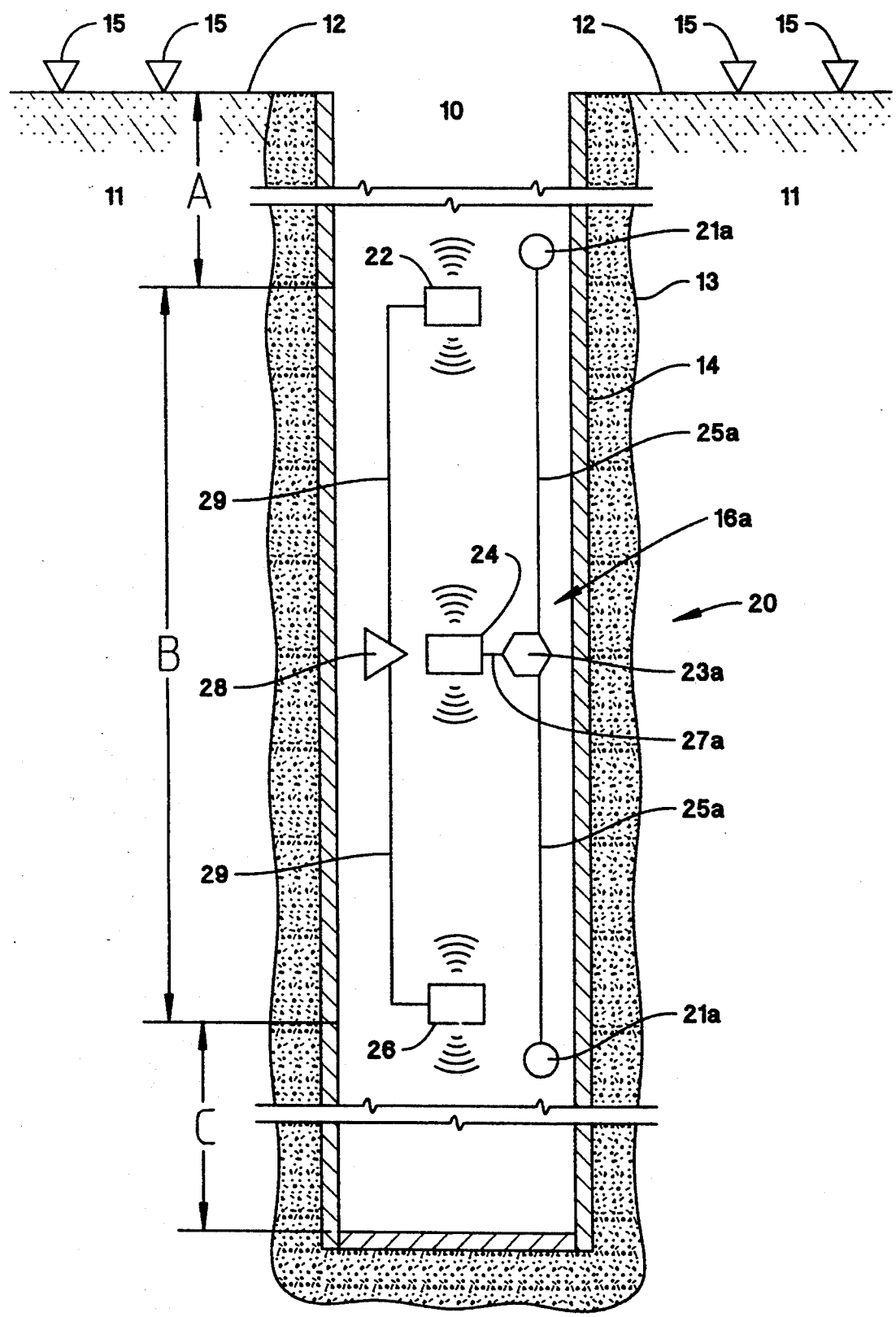
FIG. 1 schematically illustrates a first embodiment of the inventive apparatus comprising three acoustic sources positioned in a borehole casing.

As discussed above, there is a need for a more effective downhole seismic source for reverse VSP, crosswell or single well imaging in oil and gas exploration, as well as, an acoustic source which could be used for enhancing oil recovery by vibrating an oil bearing formation. Generally, a downhole acoustic source suspended in borehole fluid and producing signals below about 1,000 hertz (Hz) is suitable for such applications.

As described above, and especially at frequencies below about 1,000 Hz, a borehole forms an efficient acoustic waveguide. Thus, when a volume of liquid in a borehole is displaced by the output of an acoustic source, most of the energy radiated from the source is in the form of tube waves. This phenomenon is referred to as tube wave dominance. For example, a conventional acoustic source operating at a frequency of 100 Hz radiates energy predominantly in the form of tube waves. The energy of such tube waves exceeds the energy delivered to the formation as P- and S-waves by a factor greater than 1,000. Tube wave dominance is discussed in greater detail in a paper by G. A. Winbow entitled "Seismic Sources in Open and Cased Boreholes" Geophysics 56, pp 1040–1050, July, 1991

The inventive apparatus substantially reduces or eliminates the effect of tube wave dominance, thereby enhancing the energy radiated from the apparatus in the form of P- and S-waves. Also, by increasing the input impedance experienced by the source (i.e., the ratio of the acoustic pressure in the medium surrounding the source to the acoustic current produced by the source) in or near the center region of the apparatus, its P- and S- wave output can be enhanced over a range of frequencies. The tube wave dominance effect is controlled by creating low or near zero acoustic pressure regions around each end of the apparatus, while the enhanced P- and S- wave output over a frequency range arises from increasing the impedance, and hence, the acoustic pressure in or near the region around the center of the apparatus. The means for reducing the tube wave dominance effect and increasing the impedance experienced in or near the center region of the apparatus will be discussed in the context of four illustrative embodiments.

Because the inventive apparatus can be assembled using any of a variety of components typically known and available to a person of ordinary skill in the art, the means for connecting and synchronizing the operation of its components will be described in general terms; specific means will become apparent as the various embodiments are described more fully below. Detailed descriptions of specific components will be provided where necessary to understand or practice the invention. Moreover, cost considerations, the borehole environment, and the intended purpose in using the inventive apparatus will dictate the specific means that may be the most practical in constructing a particular embodiment. Accordingly, all embodiments of the inventive apparatus are presented schematically only.

Also, in order to simplify the illustrations, certain features typically found in the borehole environment, such as wireline connections from the surface to the apparatus, tool housings for combining various components of the apparatus, or the borehole fluid, are not shown in the related illustrations. For instance, the components of FIGS. 1–4 would normally be included within a tool lowered on the end of a wireline (not shown) through which electrical power and control signals are supplied. Alternatively, the tool could be controlled through a fiberoptic cable or coil tubing (also not shown).

All parameter terms typically used for describing electrical circuits, such as current, impedance, reactance, inductance, capacitance, and resistance, will be used herein in the context of their acoustic meaning, unless otherwise indicated. The acoustic meaning of these terms will be reviewed below following an overview of the embodiments. Each of the embodiment descriptions provided herein is only for illustrative purposes and not for limitation of the invention, as other combinations and variations will become apparent as one of ordinary skill in the art follows the detailed description below.

OVERVIEW OF EMBODIMENTS

A first embodiment 20, illustrated in FIG. 1, comprises an array of acoustic sources 22, 24, 26 used to produce a destructive interference effect between the energy radiated by the intermediate source 24 and the energy radiated by the first and second end sources 22, 26. The tube wave dominance effect can be reduced or eliminated by synchronizing the phase and amplitude of the energy emitted by the sources 22, 24, 26 so that an acoustic pressure null is created at and beyond each end of the apparatus 20 (i.e., regions A and C). This means that one or more standing waves are established in the region of the borehole 10 (i.e., region B) between the end sources 22, 26. Consequently, the energy emitted by the intermediate source 24 is not wasted in the form of tube waves propagating mainly inside the casing 14. However, in this embodiment the energy emitted by the sources 22, 24, 26 which is substantially delivered to the formation 11 as P- and S-waves is only maximized at discrete resonant frequencies determined by the condition that the distance separating the end sources is equal to an odd number of half tube wave wavelengths. Such a system is customarily referred to as a "half wave resonant cavity".

Figure 2:
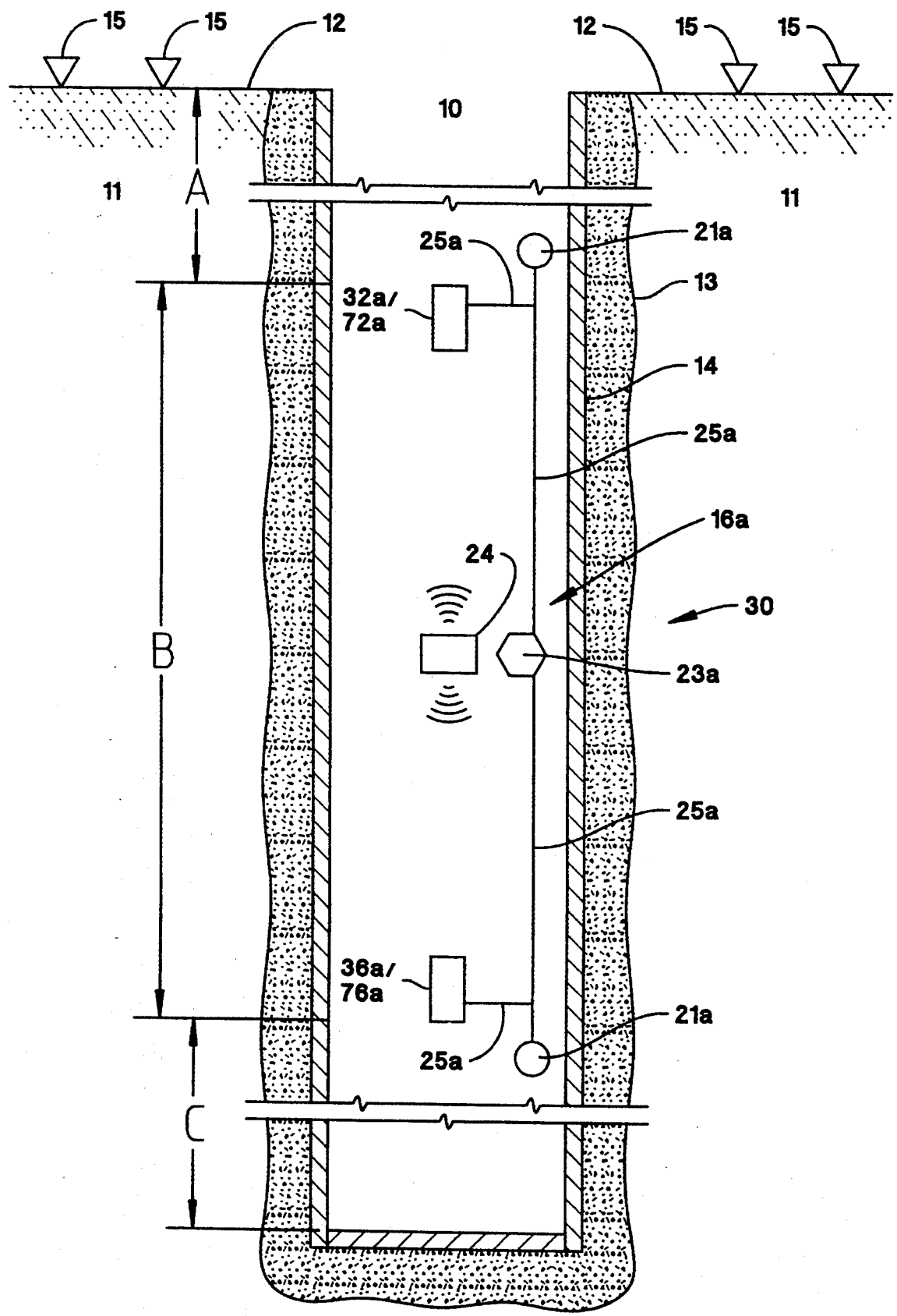
FIG. 2 schematically illustrates a second embodiment of the inventive apparatus comprising an acoustic source and two acoustic capacitors or resonators positioned in a borehole casing.

A second embodiment 30, illustrated in FIG. 2, comprises an intermediate acoustic source 24 and first and second end capacitors 32a, 36a or resonators 72a, 76a used to produce a near zero acoustic impedance condition at each end of the apparatus 30. Such a near zero acoustic impedance condition provides an alternative approach to mitigating the tube wave dominance effect. When the acoustic impedance at each end of the apparatus is zero or near zero an acoustic pressure null is created at and beyond each end of the apparatus 30. Maintaining such a near zero acoustic impedance condition therefore substantially prevents the tube waves from propagating into the region of the borehole beyond the end capacitors 32a, 36a or resonators 72a, 76a. As in the case of the first embodiment, the energy radiated by the intermediate source 24 which is substantially delivered to the formation 11 as P- and S-waves is maximized only for those designated frequencies where the system forms a half wave resonant cavity.

Because both the first and second embodiments 20, 30 of the apparatus can increase P- and S-wave output only at those frequencies where the system forms a half wave resonant cavity, additional acoustic capacitance is required for each apparatus to be equally effective for non-resonant frequencies. Such additional acoustic capacitance is added in the form of internal capacitors 32b, 36b or resonators 72b, 76b (see FIGS. 3 and 4) which allow each apparatus to radiate substantially P- and S-waves over a range of frequencies, whether the frequency range includes a half wave resonant frequency or not.

Figure 3:
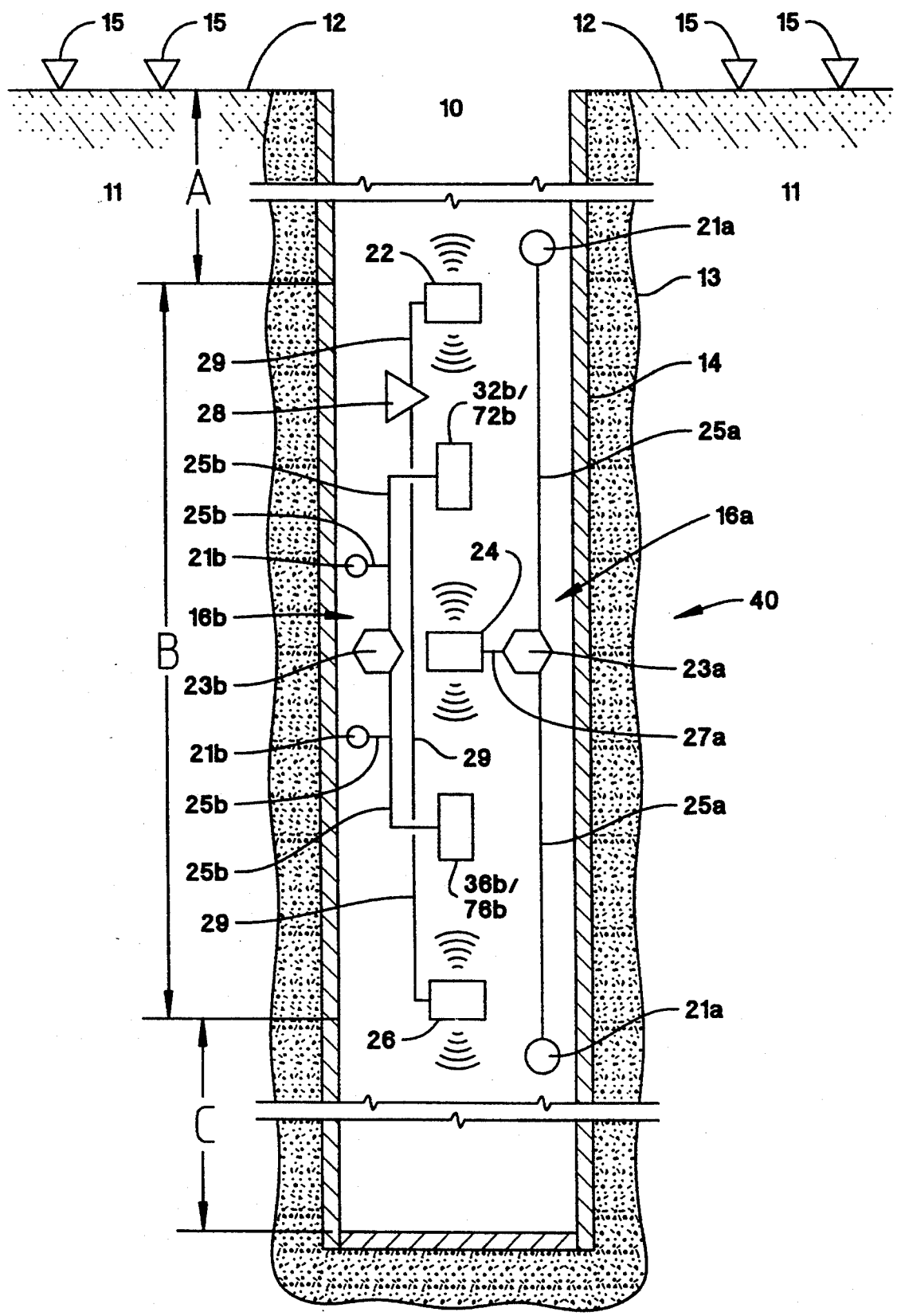
FIG. 3 schematically illustrates a third embodiment of the inventive apparatus comprising three acoustic sources and two acoustic capacitors or resonators positioned in a borehole casing.

Therefore, the third embodiment 40, illustrated in FIG. 3, comprises the array of synchronized acoustic sources 22, 24, 26 as described under the first embodiment, with each internal acoustic capacitor 32b, 36b, or resonator 72b, 76b, positioned, respectively, between each end source 22, 26 and the intermediate source 24. Each capacitor 32b, 36b or resonator 72b, 76b can be tuned to produce a specific capacitive term for producing a large impedance for the intermediate source 24, as further described below.

Figure 4:
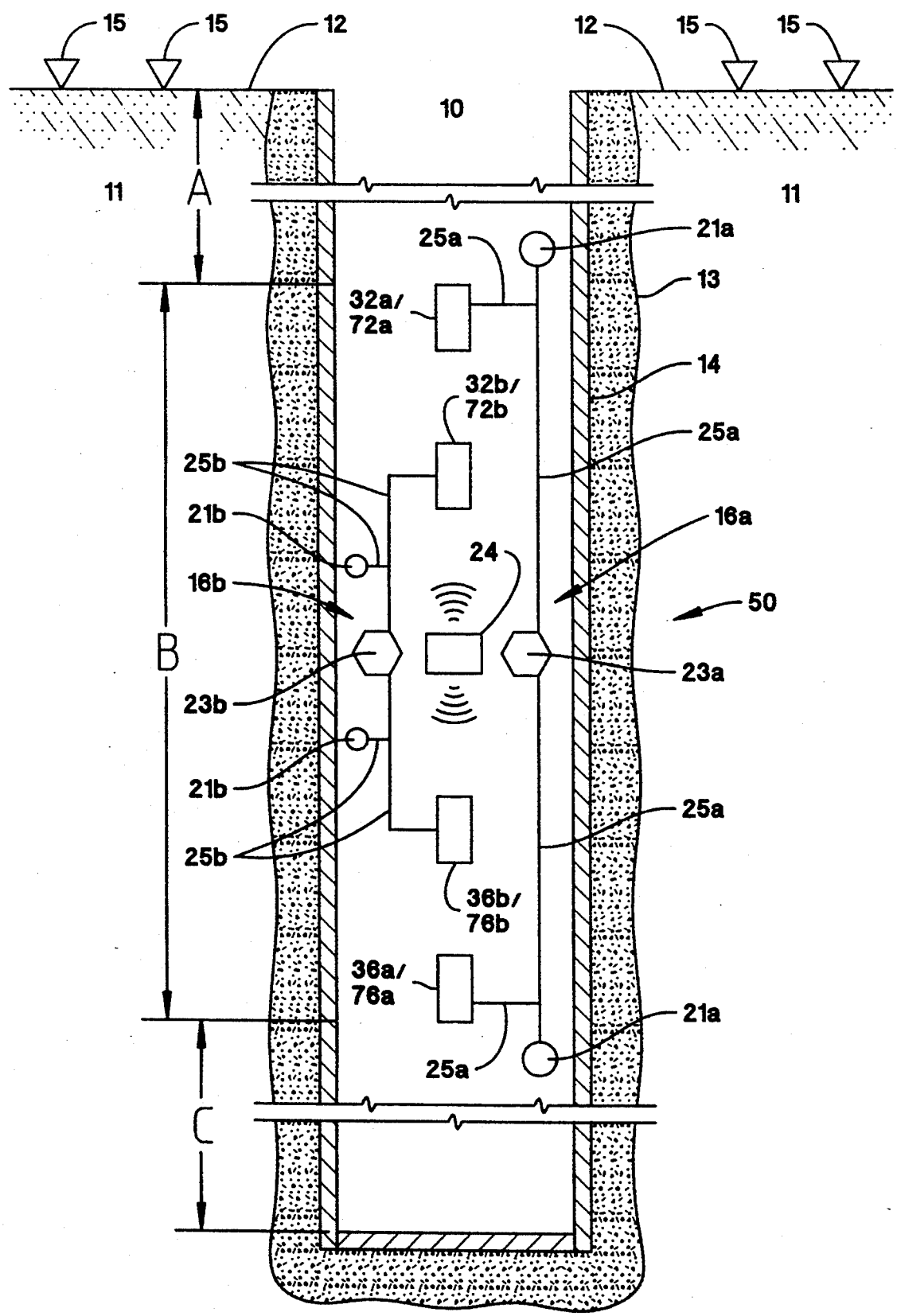
FIG. 4 schematically illustrates a fourth embodiment of the inventive apparatus comprising an acoustic source and four acoustic capacitors or resonators positioned in a borehole casing.

The fourth embodiment 50, illustrated in FIG. 4 comprises the intermediate acoustic source 24 and the first and second end capacitors 32a, 36a or resonators 72a, 76a as described under the second embodiment. This embodiment also creates a large acoustic impedance over a range of frequencies because each internal acoustic capacitor 32b, 36b or resonator 72b, 76b can be tuned to produce a specific capacitive term for producing a large acoustic impedance for the intermediate source 24.

THE ELECTRICAL/ACOUSTICAL ANALOGY

To facilitate the description of the inventive apparatus, its various components and their operation will be explained in terms of well known electrical circuit parameters which can be analogized to acoustical parameters.

Conceptually, acoustic pressure, P, is analogous to voltage and acoustic current, I, is analogous to electrical current. Acoustic current measures the volume of fluid flow per unit of time, often referred to as the fluid flow rate, for convenience. Acoustic impedance, Z, is analogous to electrical impedance and measures the opposition that an acoustic system presents to the passage of an acoustic current when an acoustic pressure is applied (see McGraw-Hill Encyclopedia of Science & Technology, 7th Edition, vol. 1, p. 68). Therefore, an acoustic system has a high acoustic impedance where the opposition presented by the system produces a high acoustic pressure when the fluid flow rate or acoustic current is small.

In quantitative terms, acoustic impedance is the ratio of acoustic pressure, P, to the acoustic current, I.

$$Z = P/I \quad (1)$$

Consequently, an acoustic system operating under high acoustic pressure but with low fluid flow rate would have a correspondingly high Z value. Also, where Z is zero the acoustic pressure in the system is also zero.

Acoustic impedance, like electrical impedance, is comprised of a real part, R, and an imaginary part, iX, where $i = \sqrt{-1}$.

$$Z = R + iX \quad (2)$$

The real part of the acoustic impedance or the resistive term is equal to the sum of an acoustic system's radiation resistance, $R_{Rad}$, and its internal resistance, $R_{Int}$.

$$R = R_{Rad} + R_{Int} \quad (3)$$

Radiation resistance arises from energy losses used in generating P- and S-waves while internal resistance is associated with various dissipative losses such as those arising from fluid frictional forces or the movement of fluid through constricted passages.

The imaginary part of the acoustic impedance includes the acoustic system's total reactance, X. The total reactance of the system may be positive or negative. For example, reactance is positive for an inductor. An inductor's acoustic reactance at a frequency, f, is equal to $L(2\pi f)$, where L is the source's acoustic inductance. Reactance is negative, however, for an acoustic capacitor. A capacitor's acoustic reactance at a frequency, f, is equal to $-1/(2\pi fC)$, where C is the capacitor's acoustic capacitance.

Acoustic inductance, L, is also known in the art as acoustic mass (see McGraw-Hill Encyclopedia of Science & Technology, 7th Edition, vol. 1, p. 68). Acoustic mass or inductance is associated with accelerating a mass of fluid with a force which displaces the fluid without appreciably compressing it. Acoustic capacitance, C, is also known in the art as acoustic compliance (see McGraw-Hill Encyclopedia of Science & Technology, 7th Edition, vol. 1, p. 68). Acoustic compliance or capacitance is associated with compressing a volume of fluid with a force without an appreciable average displacement of the center of gravity of such fluid volume.

Whether or not the reactance at some point in an acoustic system is positive or negative or is eliminated will depend on the magnitude of the acoustic inductance, L, for the system's acoustic source or sources and the presence or absence of one or more capacitors and the magnitude of each capacitor's acoustic capacitance, C. If a capacitor is placed in parallel with an inductor the reciprocal of the total reactance, X, is expressed as the sum of the reciprocal values for the acoustic inductance and the acoustic capacitance.

$$1/(iX) = [1/(i2\pi fL)] + i2\pi fC \quad (4a)$$

The oscillation of a wave may be described by its circular frequency $\omega$. $\omega$ is equal to $2\pi f$, where f is the frequency of the wave (i.e., the number of oscillations per second). Therefore, equation 4a can be simplified as follows.

$$1/(iX) = [1/(i\omega L)] + i\omega C \quad (4b)$$

The power with which P- and S-waves can be produced from some source in the system is the product of the system's acoustic impedance at that point and the square of the absolute value of the acoustic current supplied by the source.

$$W_{Src} = Z \times |I|^2 \quad (5a)$$

or $$W_{Src} = (r + iX) \times |I|^2 \quad (5b)$$

$W_{Src}$ is the total sound power or energy produced by some source in the system where the real part $R|I|^2$ is the total power actually consumed by a system (i.e., the sum of the internal energy losses, $R_{Int}$, and external radiation, $R_{Rad}$). The imaginary part $iX|I|^2$ describes the power flow into and out of the system but not radiated out away from the system or dissipated (see *Classical Electrodynamics*, 2nd Edition, 1975, by J. D. Jackson, John Wiley, p. 244). Also, note that a large value of X compared with R means that the source operates very inefficiently because more of the power or energy is merely flowing into and out of the system than is being consumed to produce of P- and S-waves.

The rate of flow of acoustic energy or acoustic power which is actually radiated as P- and S-waves into the formation surrounding an acoustic source can be related to the acoustic pressure around the source, $P_o$, as follows.

$$W_{Rad} = |P_o|^2 \times [R/(R^2 + X^2)] \quad (5c)$$

Equation 5c is valid where an acoustic pressure null at and beyond each end of the apparatus is created with (1) an acoustic capacitor 32a, 36a, or resonator 72a, 72b at each end (as in the embodiment illustrated in FIG. 2) or, (2) an acoustic source 22, 26 at each end (as in the embodiment illustrated in FIG. 1) or, (3) an acoustic capacitor 32a, 36a, or resonator 72a, 72b at one end and an acoustic source 22, 26 at the other end. The second term of equation 5c, $R/(R^2 + X^2)$, may also be referred to as the acoustic admittance of the formation, $A_F$. From equation 5c we see that the magnitude of the acoustic power radiated into the formation is directly proportional to the square of the acoustic pressure around the source, $P_o$. From equation 1 we know that $P_o$ is directly proportional to the acoustic impedance seen by the source, $Z_o$.

$$P_o = Z_o \times I_o \quad (5d)$$

Consequently, we can see how the sound power radiated through a formation, $W_{Rad}$, can be large even though the acoustic current is small provided the acoustic impedance, $Z_o$, around the center is sufficiently large.

DESCRIPTION OF OPERATIONAL PRINCIPLES

One objective of the invention is to produce a zero or near zero acoustic impedance at or near each end of the apparatus 20, 30, 40, 50. This can be achieved by using either synchronized acoustic sources 22, 26 or acoustic capacitors 32a, 36a or resonators 72a, 76a at each end of the apparatus.

First, we will discuss the relationships relevant to the case where acoustic sources 22, 26 are positioned at each end of the apparatus (see FIG. 1). As mentioned above, a destructive interference effect between tube waves radiated from the intermediate source 24 and each end source 22, 26 is established to control tube wave dominance by creating a zero or near zero acoustic impedance at each end of the apparatus. The complete destructive interference of all tube waves produced by the intermediate source 24 occurs where (1) the total sum of the acoustic pressure amplitudes of tube waves produced by the first and second end sources 22, 26 is equal to the acoustic pressure amplitude of the tube waves produced by the intermediate source 24 and (2) the end source tube waves are 180° out of phase with intermediate source tube waves (i.e., the crest of a wave radiated from the intermediate source 24 coincides with the trough of a wave radiated from an end source 22, 26). This destructive interference condition is expressed by the following relationships expressed in terms of the acoustic current for each source.

$$I_1 \times \sin \theta_1 = I_2 \times \sin \theta_2 \quad (6a)$$

$$[I_1 \times \sin(\theta_1 + \theta_2)] + (I_o \times \sin \theta_2) = 0 \quad (6b)$$

$$[I_2 \times \sin(\theta_1 + \theta_2)] + (I_o \times \sin \theta_1) = 0 \quad (6c)$$

In equations 6a-c, $\theta_n = \omega D_n / V_T$, where n identifies the end of the apparatus having first and second end sources 22, 26, i.e., n=1 and 2, respectively, $D_n$ is the distance between the intermediate source 24 and the respective end source 22, 26, $\omega$ is the circular frequency of the tube wave produced by the end source 22, 26, $V_T$ is the velocity of the tube wave produced by each end source, $I_o$ is the fluid flow rate produced by the intermediate source 24, and $I_1$ and $I_2$ are the fluid flow rates produced by first and second end sources 22, 26, respectively.

From equation 6a and the expression for $\theta$ we can see that if the distances between each end source 22, 26 and the intermediate source 24 are substantially equal then $D_1 = D_2 = D_{\frac{1}{2}}$, so $\theta_1 = \theta_2 = \theta_{\frac{1}{2}}$ and thereby $I_1 = I_2 = I_{\frac{1}{2}}$. Consequently, either equation 6b or 6c can be simplified by substituting $\theta_{\frac{1}{2}}$ for $\theta_1$ and $\theta_2$ to produce a single expression for describing the zero acoustic impedance condition where the end sources 22, 26 are substantially equidistant from the intermediate source.

$$I_o + [2I_{\frac{1}{2}} \times \cos(\omega D_{\frac{1}{2}} / V_T)] = 0 \quad (6d)$$

Despite controlling the tube wave dominance effect, the energy emitted by the intermediate source 24 will be maximized for a given acoustic current only at resonant frequencies if no internal acoustic capacitance is added to the system. The resonant frequency of a tube wave corresponds to that tube wave wavelength which is about twice the length of the distance between the first and second ends of the apparatus. How acoustic capacitance can be used to overcome this resonant frequency limitation will be considered subsequent to the following discussion relating to acoustic capacitance used for mitigating the tube wave dominance effect.

The relationships useful for describing the performance of acoustic capacitors 32a, 36a or resonators 72a, 76a positioned at each end of the apparatus will now be discussed (see FIG. 2). $Z_C$ refers to the input acoustic impedance of an acoustic capacitor 32, 36 of the type depicted in FIG. 6 and described in greater detail below. $Z_R$ refers to the input impedance of an acoustic resonator 72, 76 of the type illustrated in FIG. 7, also described in greater detail below. The relationship describing resonator input impedance is more complex than that for capacitor input impedance and therefore will be considered after discussion of capacitor input impedance. A simple capacitor input impedance can be related to acoustic capacitance, C, as follows.

$$Z_C = 1/i\omega C \quad (7a)$$

$Z_C$ is determined by the following equation.

$$Z_C = -i(\rho_{flu} \times V_t / S_C) \times \cot \theta \quad (7b)$$

In equation 7b, $\theta = (\ell \times \omega / V_T)$ where $\ell$ is the effective length of the capacitor cavity 34, $\omega$ is the circular frequency of the tube wave inside the capacitor received by the capacitor, $V_T$ is the velocity of the tube wave, while $\rho_{flu}$ is the density of the fluid in the capacitor 34, and $S_C$ is the cross sectional area of the fluid-containing portion of the capacitor cavity 34.

From equation 7b we can see how the input impedance, $Z_C$, approaches a value of zero as the value of $\theta$ approaches $\pi/2$. The periodic relationship between the cotangent of $\theta$ and the value of $\theta$ is graphically illustrated in FIG. 8 where the cotangent of $\theta$ equals zero for odd integer multiples of $\pi/2$. Therefore, a resonant cavity (i.e., $Z_C = 0$) is obtained where the effective length, $\ell$, of the cavity is adjusted to produce a $\theta$ equal to or equal to an odd integer multiple of $\pi/2$, but preferably one times $\pi/2$. So, where the length of an acoustic cavity is 11.25 ft., we can determine the wave frequency, f, at which the resonant condition will be produced. Using the zero input impedance condition of $\theta = \pi/2$ and equating $\theta$ to the cotangent term of equation 7b yields $\pi/2 = (\omega \times \ell)/V_T$. Recalling that $\omega = 2\pi f$, the zero impedance expression can be solved so that f is expressed in terms of $\ell$ and $V_T$.

$$f = V_T / (4 \times \ell) \tag{7c}$$

Consequently, for $\ell = 11.25$ ft. and $V_T = 4,500$ ft./second a resonant frequency of 100 Hertz is obtained.

The effective length, $\ell$, of the capacitor cavity 34 can be changed as $\omega$ changes to maintain $\theta$ substantially equal to $\pi/2$ and thereby maintain a near zero acoustic impedance condition at or near the end of the apparatus. However, frequencies substantially unequal to the resonant frequency will not efficiently produce P- and S-waves despite the mitigation of the tube wave dominance effect. The resonant frequency is related to the distance between the ends of the apparatus in the same fashion as the case discussed above involving two end sources 22, 26. Therefore, for an apparatus having end capacitors 32a, 36a the resonant frequency also corresponds to a tube wave wavelength which is about two times the length of the distance between the first and second ends of the apparatus.

As can be seen from the example above, the length of the capacitor cavity 34 needed to control tube wave frequencies typically produced by certain seismic sources is relatively large. Dimensions of that order of magnitude or greater can present some limitations from an engineering or field application standpoint.

Figure 7:
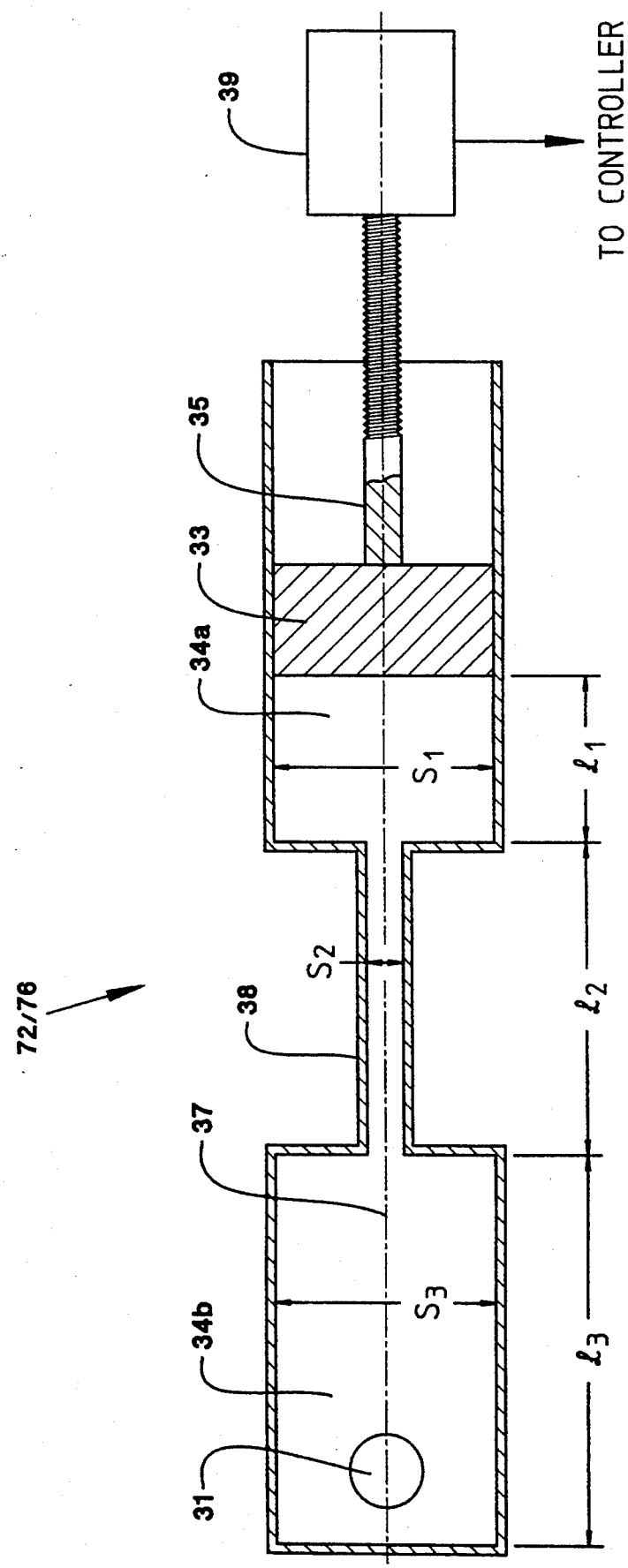
FIG. 7 (Prior Art) illustrates a Helmholtz resonator adaptable for use in the inventive apparatus.

FIG. 7 illustrates one example of an alternative type of device for producing acoustic capacitance, known as a Helmholtz resonator 72, 76. Such a resonator 72, 76 provides a more compact form of a capacitor which may be adapted for use in all embodiments of the inventive apparatus requiring a capacitor. Although the principle of operation for resonator 72, 76 is substantially similar to the capacitor 32, 36, the relationship between input impedance of the resonator 72, 76 and the effective length, $L_1$, of the first resonator cavity 34a is more complex than the relationship identified in equation 6. Nonetheless, the effective length of the first resonator cavity 34a can be used to control the input impedance, $Z_R$, of a resonator 72, 76 and thereby control the acoustic pressure, P, and acoustic reactance, X, produced by the inventive apparatus having resonators.

Specific applications of the resonator 72, 76 will be described below. However, the same basic design of the resonator 72, 76 can be employed universally or in part with the various embodiments of the synchronized acoustic source 30, 40, or 50. The basic distinction between the capacitor identified in FIG. 6 and the resonator of FIG. 7 is the constriction 38 designed into the capacitor. A capacitor having one or more constrictions to fluid flow functions as acoustic capacitance and acoustic inductance in series and forms a resonator 72, 76, commonly known as a Helmholtz resonator. This constriction substantially reduces the length of the first resonator cavity 34a required to create a near zero impedance condition. The effective length, $\ell_1$, of the first resonator cavity 34a is related to the input impedance, $Z_R$, of resonator 72, 76, as follows.

$$Z_R = \frac{[(a_2 a_3) - (a_1 a_3 t_1 t_2) - (a_1 a_2 t_1 t_3) - (a_2^2 t_2 t_3)]}{i[(a_1 a_2 a_3 t_1) + (a_2^2 a_3 t_2) + (a_2 a_3^2 t_3) - (a_1 a_3^2 t_1 t_2 t_3)]} \tag{8}$$

In equation 8, $a_n = S_n / (\rho_{flu} V_T)$, $t_n = \tan \theta_n$, and $\theta_n = \omega \ell_n / V_T$ where n designates the subscript number 1, 2, or 3 identifying the first resonator cavity 34a, constriction 38, and the second resonator cavity 34b, respectively, $S_n$ is the cross sectional area of the fluid-containing portion of the designated cavity or constriction, $\rho_{flu}$ is the density of the fluid in the resonator, $V_T$ is the velocity of the tube wave, $\omega$ is the circular frequency of the tube wave received by the resonator, and $\ell_n$ is the effective length of the designated cavity 34a, 34b or constriction 38.

Figure 6:
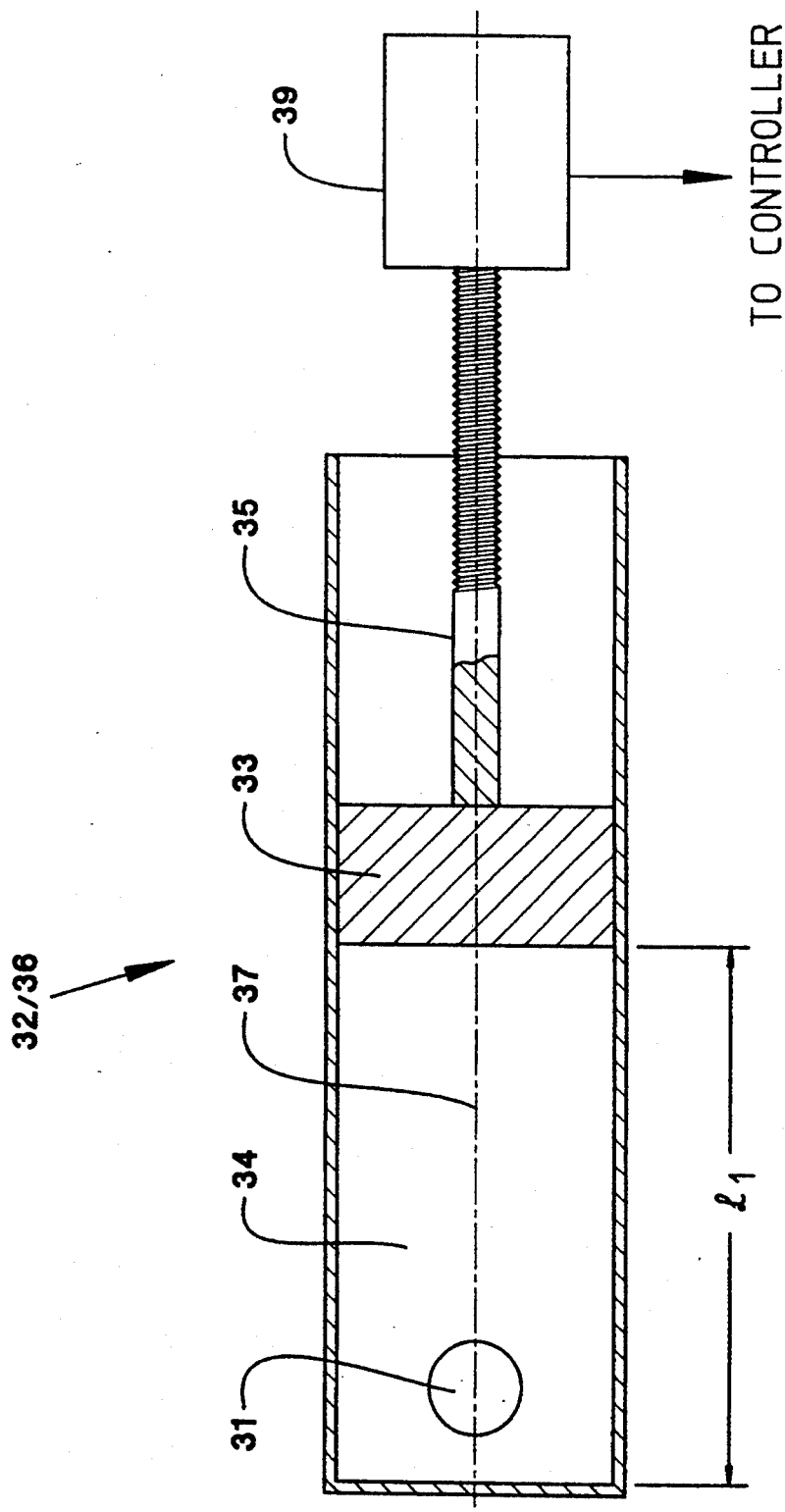
FIG. 6 (Prior Art) illustrates a simple acoustic capacitor adaptable for use in the inventive apparatus.

Solving equation 8 for a zero input impedance condition (i.e., $Z_R = 0$) over a range of frequencies, for $V_T = 4,500$ ft./second and where $\ell_1 = \ell_2 = \ell_3$, $S_1 = S_3$, and $S_2/S_1 = 1/16$, the total length of the resonator is about one-half the length of a an acoustic capacitor 32, 36 like that illustrated in FIG. 6.

The Helmholtz resonator 72a, 76a positioned at the end of the apparatus, as with a similarly positioned capacitor 32a, 36a, will ensure that intermediate source 24 radiates substantially P- and S-waves only for a resonant frequency, which also corresponds to a wavelength that is about twice the length of the distance between the ends of the apparatus. Using additional acoustic capacitance to overcome the resonant frequency limitation discussed above will be discussed below in the context of producing a large input impedance around the intermediate source 24.

A second objective of the invention is to produce a large input impedance in the area of the intermediate source 24 so that the energy radiated therefrom at non-resonant frequencies is maximized for a given acoustic current. This can be achieved by introducing new or additional acoustic capacitance in parallel with the acoustic system's inductance and resistance which are in series with one another. As illustrated in FIGS. 3 and 4, the parallel acoustic capacitance may be introduced in the form of internal capacitors 32b, 36b or internal resonators 72b, 76b positioned between intermediate acoustic source 24 and each of the end sources 22, 26 (FIG. 3) or between intermediate acoustic source 24 and each of the end capacitors 32a, 36a or end resonators 72a, 76a (FIG. 4).

Under such a configuration the total acoustic reactance of the system, X, includes both an inductive term, $\omega L$, and a capacitive term, $-1/\omega C$. Where elements of an acoustical or electrical system are in parallel the sum of the reciprocals of the system's various acoustic resistances and impedances equal the reciprocal of the total impedance. Therefore, the input impedance experienced by an intermediate acoustic source 24, $Z_o$, can be expressed as follows.

$$1/Z_o = [1/(R+i\omega L)] + i\omega C \quad (9a)$$

This relationship can be algebraically manipulated to establish a complex relationship between $Z_o$, L, R, and C.

$$Z_o = \frac{[R/(R^2 + \omega^2 L^2)] - i\omega[C - (L/(R^2 + \omega^2 L^2))]}{\omega^2[C - (L/(R^2 + \omega^2 L^2))]^2 + R^2/(R^2 + \omega^2 L^2)^2} \quad (9b)$$

The acoustic pressure amplitude is proportional to the modulus of $Z_o$, i.e., $|Z_o|$, which may be derived from equation 9b by obtaining an expression for $|Z_o|^2$ in terms of L, R, and C, shown below in equation 9c.

$$|Z_o|^2 = 1[\omega^2]C - (L/(R^2+\omega^2 L^2))]^2 + [R^2/(R^2+\omega^2 L^2)^2]] \quad (9c)$$

Where the acoustic capacitance, C, is selected to satisfy the following relationship, we can see from equation 9c that $|Z_o|^2$ is maximized and from equation 9b that the imaginary part of $Z_o$, (i.e., the reactance, X) vanishes.

$$C = L/(R^2+\omega^2 L^2) \quad (9d)$$

A person of ordinary skill in the art will recognize this as the condition between the source inductance, L, and internal capacitance, C, which must be satisfied for the borehole fluid (not shown) to be in resonance with the intermediate source 24 and internal capacitors 32b, 36b or resonators 2b, 76b. When this condition is satisfied we know that the input impedance, $Z_o$, experienced by the intermediate source 24 is substantially maximized. When the imaginary part of $Z_o$ vanishes equation 9b may be simplified to the following relationship.

$$Z_o = R + (\omega^2 L^2/R) \quad (9e)$$

Equations 9d and 9e indicate, therefore, that where acoustic capacitance, C, is properly chosen in magnitude and is placed in parallel with that part of an acoustic system having an acoustic resistance, R, in series with an acoustic inductance, L, then the total input impedance in the area of an intermediate source 24, $Z_o$, for the acoustic system becomes real. As mentioned above under the Electrical/Acoustical Analogy section, in practice R is typically substantially smaller than $\omega L$, thus $Z_o$ becomes not only real but large in magnitude. The value of the source inductance, L, may be computed according to the following expression which may be derived from fundamental acoustic principles well known to those skilled in the art of acoustic engineering.

$$\omega L = (\rho_s v_s / S_s) \tan(\omega \mathit{l}_s / V_s) \quad (9f)$$

In equation 9f, $\mathit{l}_s$ is the distance between the apertures of the end capacitors 32a, 36a or end resonators 72a, 76a (i.e., the length of Region B in FIG. 4), $S_s$ is the cross-sectional area of the borehole exterior to the borehole, $v_s$ is the velocity of the tube wave in the borehole fluid, and $\rho_s$ is the density of the borehole fluid. The subscript "s" has been added to the parameters in equation 9f to clearly distinguish the density, sound speed, and cross-sectional area of the borehole fluid from the fluid in the internal capacitors 32b, 36b or resonators 72b, 76b which may contain a different fluid such as a liquid (e.g., oil) or a gas (e.g., nitrogen or helium).

Equation 9f is a good approximation provided losses due to friction, fluid viscosity, and energy radiation are neglected.

When $Z_o$ is large in magnitude, a relatively small flow rate or acoustic current, I, can produce a large acoustic pressure in the region of the borehole 10 around the intermediate source 24. With this large acoustic pressure around the center of the apparatus the energy radiated at all frequencies is maximized for a given acoustic current. Accordingly, the resonant frequency limitation discussed previously is overcome using internal capacitors 32b, 36b, or internal resonators 72b, 76b.

The utility of internal capacitors for maximizing $Z_o$ and thereby $P_o$ and $W_{Rad}$ becomes apparent by considering equation 9e. As discussed above, $\omega L$ is typically much larger than R therefore, the term $\omega^2 L^2/R$ is substantially larger than $\omega L$. Equation 9e is obtained where internal acoustic capacitance is added in parallel to the acoustic resistance and acoustic inductance in series with each other. Comparing this situation with equation 2 where no internal acoustic capacitance has been added and where $X = \omega L$, so $Z_o = R + i\omega L$, we see how $Z_o$ can become substantially larger by introducing internal acoustic capacitance, even where the acoustic current, $I_o$, around the center may be small.

The relationship between the effective length of a capacitor cavity, $\mathit{l}$, and the internal acoustic capacitance, C, placed in parallel with the acoustic resistance and acoustic inductance can be established as follows. Recalling that $Z_C = 1/i\omega C$ and solving equation 7a for C so that $C = (S_C/\omega \rho_{flu} V_T) \times \tan \theta$ and then equating this expression with equation 9d we obtain the following expression for $\theta$ (i.e., $\mathit{l} \times \omega/V_T$) for simple internal capacitors 32b, 36b.

$$\tan \theta = (\omega \rho_{flu} V_T L)/S_C[R^2 + \omega^2 L^2] \quad (9g)$$

Figure 8A:
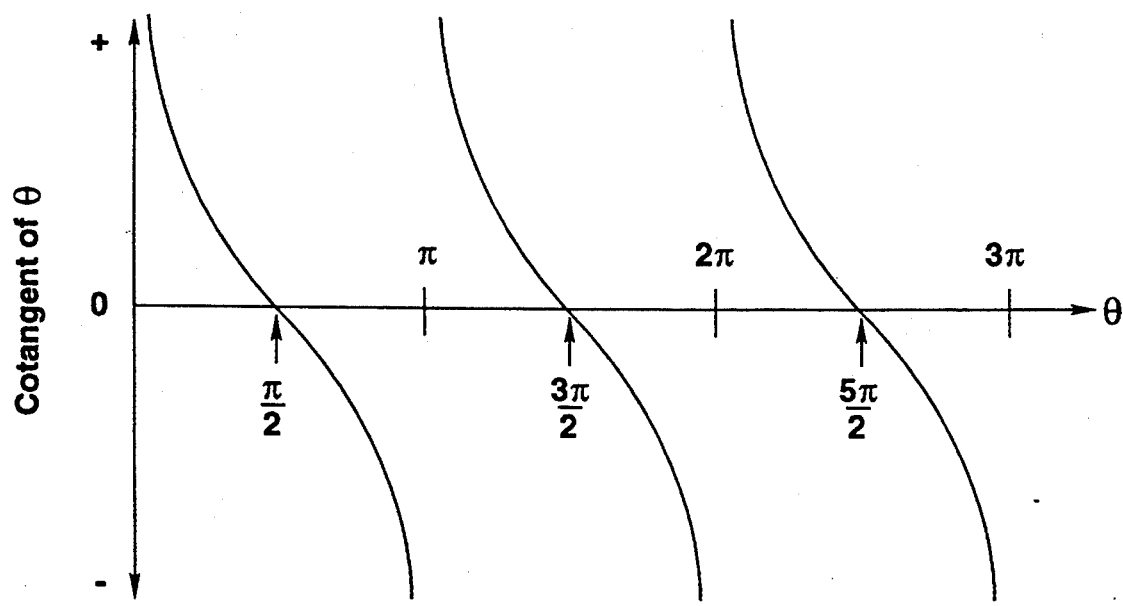
FIG. 8A graphically illustrates the relationship between an angle $\theta$ and the cotangent of $\theta$ for values of $\theta$ ranging from zero to $3\pi$.
Figure 8B:
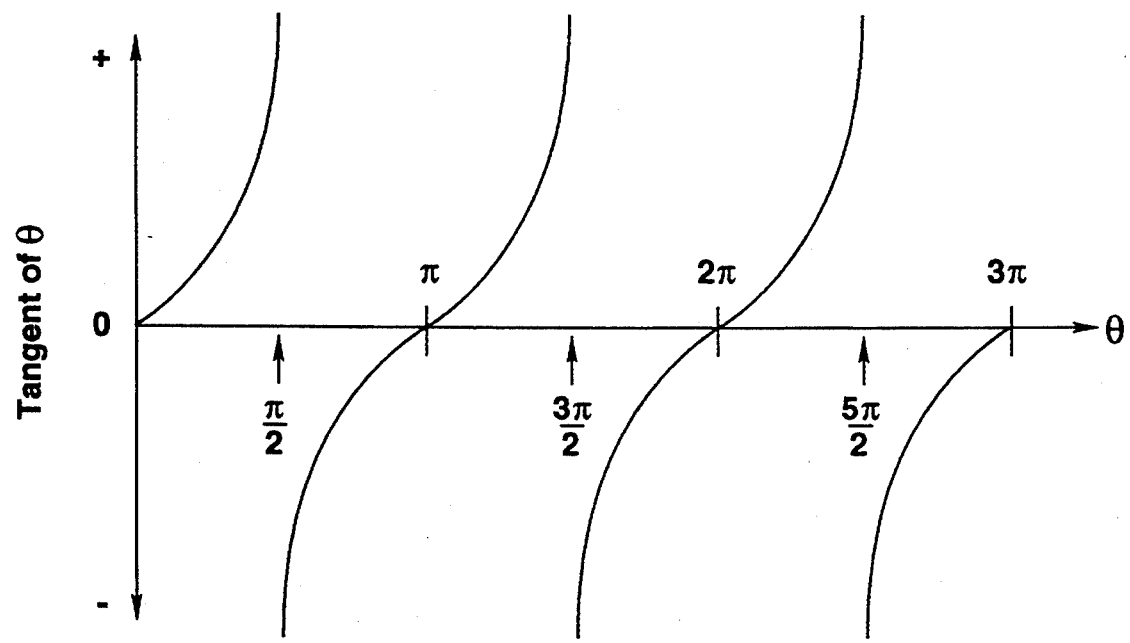
FIG. 8B graphically illustrates the relationship between an angle $\theta$ and the tangent of $\theta$ for values of $\theta$ ranging from zero to $3\pi$.

Since the value of the right hand side of equation 9g is real and greater than or equal to zero we know that $\theta$ and hence L can be selected to satisfy equation 9f. FIG. 8B illustrates the well known periodic relationship between the tangent of $\theta$ and the value of $\theta$. Consequently, the value of $\theta$ can be between $n\pi$ and $(n+\frac{1}{2})\pi$ where n = any integer, but is preferably between zero and $\pi/2$.

For frequencies greater than or less than the half wave resonance frequency, $f_R$, the resonant condition between the borehole fluid (not shown) and the internal capacitors 32b, 36b or resonators 72b, 76b is maintained with a capacitor cavity 34 (see FIG. 6) having an effective length, $\mathit{l}$, that can satisfy equation 9f for the frequency, f, of each tube wave produced by the intermediate source 24. Recall from previous discussion that a "half wave resonant cavity" is produced when the distance separating the end capacitors 32a, 36a or end resonators 72a, 76a is equal to an odd integer multiple of a half tube wave wavelength. Therefore, the half wave resonance frequency, $f_R$, corresponds to the wavelength of the tube wave produced by the intermediate source 24 where an odd integer multiple of one half the tube wave wavelength is approximately equal to the distance between the end capacitors 32a, 36a or resonators 72a, 76a (i.e., the length of region B in FIG. 4). Hence, $f_R$ is that frequency at which no internal capacitance is required. When the frequency, f, of the tube wave produced by the intermediate source 24 is equal to $f_R$ internal capacitance is not required to produce a resonance effect in the borehole fluid and the intermediate source 24. However, where f is less than or greater than $f_R$ internal capacitors are required to produce a resonance effect. As explained more fully below, frequencies which are significantly less than $f_R$ (i.e., $f << f_R$) will require larger capacitance, C, accordingly. Because C is limited by the diameter and length available for the tool, there is a certain minimum frequency, $f_{min}$, at which the inventive apparatus can maintain the resonant condition under equation 9d and ensure that the apparatus operates efficiently.

The effective length of internal acoustic capacitors 32b, 36b or resonators 72b, 76b can be varied to maintain a resonant condition using either of two methods for changing the effective length of the capacitor cavity 34. Either method can maintain a resonant condition over a frequency range up to about $2f_R$. For example, with one method, referred to hereafter as the jump method, $l$ would range from some predetermined length, x, to zero for frequencies between some initial frequency $f_{min}$ and the first resonant frequency, $f_R$, and would range from y to y−x for frequencies between $f_R$ and some final frequency, $f_{max}$. The value for y would be greater than x and equal to $V_c/2f_R$, where $v_c$ is the velocity of the tube wave in the capacitor. The value for x corresponds to the maximum capacitance, $C_{Msx}$, required to produce a resonant condition at $f_{min}$ and value for y−x corresponds to the maximum negative capacitance, $-C_{max}$, required to produce a resonant condition at $f_{max}$. It should be noted that $f_{max}$ may be approximated as equal to $2f_R - f_{min}$ if energy losses are neglected. However, for convenience we will refer to the final frequency of the selected frequency range as $f_{max}$.

Alternatively, with a second method, referred to hereafter as the continuous method, $l$ would range from (y+x) to y, for frequencies between $f_{min}$ and $f_R$ and would range from y to y−x for frequencies between $f_R$ and $f_{max}$.

The frequencies at which a resonant condition between the borehole fluid (not shown) and internal capacitors 32b, 36b or resonators 72b, 76b is obtained may be derived from equation 9d which establishes the condition that must be satisfied for substantially maximizing the input impedance, $Z_o$, experienced by the intermediate source 24. Because the square of the inductive term, $\omega^2 L^2$, is very large compared to the resistance term, $R^2$, the resistance term is approximated as zero. Therefore, equation 9d can be approximately simplified to the following relationship between C, L and $\omega$ which must be satisfied for a resonant condition to be produced.

$$C = L/\omega^2 L^2 \quad (10a)$$

Equation 10a can be rewritten as follows;

$$\omega^2 LC = 1 \quad (10b)$$

or $$(\omega L)(\omega C) = 1 \quad (10c)$$

The value of the inductive term, $\omega L$, can be obtained from equation 9f while the value for the capacitative term, $\omega C$, can be determined from equations 7a and 7b. Consequently, each term can be written as a tangent function thereby showing how the effective length of the capacitor cavity 34 can be used to maintain the resonance condition.

$$\tan(\omega l_s/v_s)\tan(\omega l_1/v_c) = S_s\rho_c v_c/S_c\rho_s v_s \quad (10d)$$

In equation 10d, the subscript "s" identifies parameter values related to the inventive apparatus, while the subscript "c" identifies parameter values related to the internal capacitors 32b, 36b or resonators 72b, 76b. However, for consistency with FIGS. 6 and 7, $l_1$ will refer to the effective length of a capacitor cavity 34 or 34a for either an internal capacitor 32b, 36b or resonator 72b, 76b, respectively. Therefore, $l_s$ is the distance between the apertures the end capacitors 32a, 36a or end resonators 72a, 76a (i.e., the length of Region B in FIG. 4), $S_s$ is the cross-sectional area of the borehole (annulus around the tool), $v_s$ is the velocity of the tube wave in the borehole fluid, $\rho_s$ is the density of the borehole fluid, $l$ is effective length of the capacitor cavity 34 or 34a, $S_c$ is the cross-sectional area of the capacitor cavity 34, $v_c$ is the velocity of the tube wave in the capacitor cavity 34, and $\rho_c$ is the density of the fluid in the capacitor cavity 34. For convenience of subsequent discussion the expression, $\omega l_s/v_s$, will be identified as an angle $\theta_s$, while the expression, $\omega l_1/v_c$, will be identified as an angle $\theta_c$. As equation 10d indicates, $l_1$ is the one parameter which may be readily varied to maintain a resonant condition as the intermediate source 24 produces tube waves having frequencies less than or greater than $f_R$.

Figure 8C:
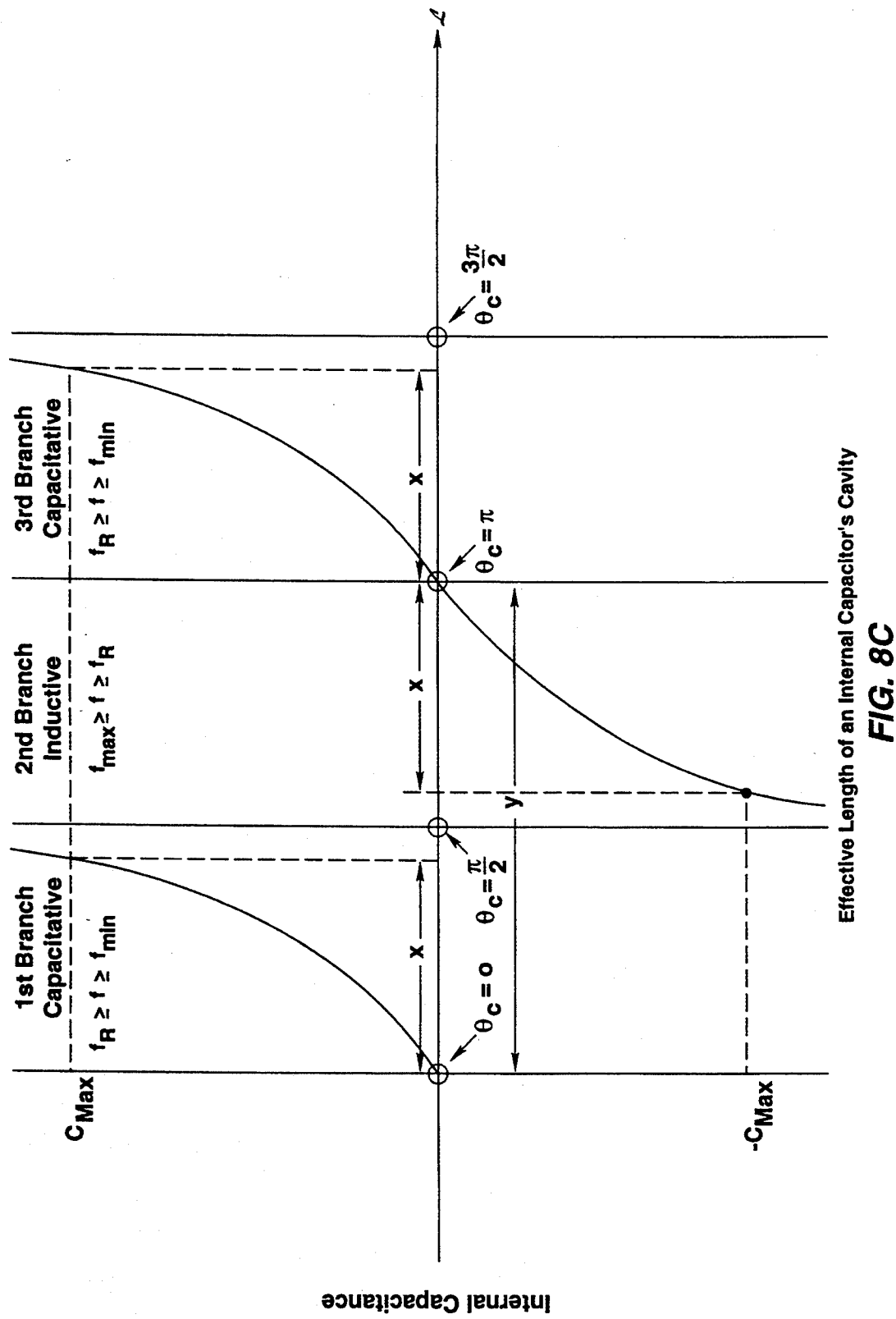
FIG. 8C graphically illustrates the relationship between the effective length, $l_1$, of an acoustic capacitor's cavity and the capacitance, C, produced by the capacitor.

Referring to FIG. 8C and recalling that $\omega = 2\pi f$, we can see how the capacitance, C, of internal capacitors 32b, 36b or resonators 72b, 76b can be varied with a change in $l_1$ for such capacitors or resonators to maintain a resonant condition. FIG. 8C graphically illustrates a periodic relationship between $l_c$ and C similar to the tangent function illustrated in FIG. 8B. Each point along the curves shown in FIG. 8C defines a capacitance, C, and corresponding effective length, $l_1$, for a capacitor cavity 34 which will maintain the resonant condition between the borehole fluid (not shown) and the internal acoustic capacitors 32b, 36b or resonators 72b, 76b. The vertical boundaries of the first, second, and third branches of the plot correspond to the points at which $\theta_c$ is equal to zero, $\pi/2$, $\pi$, and $3\pi/2$. Each $l_1$ corresponding to a half wave resonance frequency is obtained at the beginning of each odd integer branch (i.e., the first and third branch).

It should be noted that FIG. 8C is a plot for a single frequency. Each frequency in the range of tube wave frequencies produced by the intermediate source 24 will have a similar C versus $l_c$ plot but the curves will be more or less compressed (i.e., curves having larger or smaller slope) depending on the frequency of the tube wave. Each curve, however, will share a common intersection point where C equals zero and $l_1$ equals zero, y, 2y, ... ny where $y = v_c/2f$ and n equals any integer. So, for each frequency in the selected bandwidth of operation a curve with different slope will yield a unique value for C required for maintaining resonance. Therefore, the corresponding values for $l_c$ which can produce the resonant value for C can be read from each C versus $l_1$ plot related to the respective tube wave frequency, f, in the selected bandwidth.

As discussed previously, the effective length of internal acoustic capacitors 32b, 36b or resonators 72b, 76b can be varied to maintain a resonant condition using either a jump method or continuous method. Either method maintains a resonant condition over a frequency range up to some predetermined final frequency, $f_{max}$, which is about equal to $2f_R - f_{min}$, if energy losses are neglected. This approximate doubling of the bandwidth is accomplished by increasing the maximum length of the capacitor cavity 34 for internal capacitors 32b, 36b or resonators 72b, 76b. For example, where the effective bandwidth range for intermediate source 24 is 50-250 hertz using an internal capacitor 32b, 36b or resonator 72b, 76b with a maximum internal cavity length equal to x, then increasing the maximum internal cavity length to y or y+x will permit $f_{max}$ to reach about 450 hertz.

In the case of the jump method, the intermediate source 24 would produce frequencies ranging from some frequency less than $f_R$ (i.e., $f_{min}$) up to $f_R$ and from $f_R$ up to $f_{max}$. For maintaining a resonance condition in the frequency range from $f_{min}$ to $f_R$, the effective length, $\ell_1$, would decrease from some predetermined initial length, $\ell_1$, to zero. This incremental decrease in $\ell_1$ produces a commensurate reduction in C required for maintaining the resonance condition between $f_{min}$ and $f_R$. This reduction in $\ell_1$ and corresponding reduction in the capacitance, C, for the internal capacitors 32b, 36b or resonators 72b, 76b occurs in the first branch of the plot shown in FIG. 8C. Because the capacitance obtained for the internal capacitors 32b, 36b or resonators 72b, 76b is positive this first branch is identified as capacitative. For the frequency range from $f_R$ to $f_{max}$, $\ell_1$ would "jump" up or increase to some predetermined length, y, for producing a capacitance, C=0, required for producing resonance at $f_R$ and $\theta_c$ equal to $\pi$. The effective length would then be incrementally decreased to an intermediate length, slightly greater than x, which corresponds to a capacitance, C, for producing resonance at $f_{max}$ and a $\theta_c$ slightly greater than $\pi/2$. Because the capacitance obtained for internal capacitors 32b, 36b or resonators 72b, 76b is negative the second branch is identified as inductive.

In the case of the continuous method, the intermediate source 24 also would produce frequencies ranging from some frequency less than $f_R$ (i.e., $f_{min}$) up to $f_R$ and from $f_R$ up to $f_{max}$. However, the $\ell_1$ corresponding to $f_{min}$ would begin with some greater value x+y. Therefore, for maintaining a resonance condition between $f_{min}$ and $f_R$, $\ell_1$ is incrementally reduced with a commensurate reduction in C as f is increased from $f_{min}$ up to $f_R$. Referring to FIG. 8C we can see, however, that $f_R$ is observed for a $\ell_1$ value equal to $y=v_c/2f_R$ rather than 0. Because the capacitance obtained for internal capacitors 32b, 36b or resonators 72b, 76b is positive the third branch is also identified as capacitative. For maintaining a resonance condition throughout the frequency range from $f_R$ to $f_{max}$, $\ell_1$ would continue to decrease incrementally from y to y−x to produce a corresponding reduction in C until reaching a C for producing resonance at $f_{max}$ and a $\theta_c$ just greater than $\pi/2$. Again, the resonant condition between $f_R$ and $f_{max}$ is maintained with a negative capacitance, and therefore, falls under the inductive branch of FIG. 8C.

The above discussion of operational principles assumes that the internal capacitor 32/36 is a simple acoustic capacitor like that illustrated in FIG. 6. It will be understood by those skilled in the art of acoustic engineering that a similar but more complex analysis can be made where a Helmholtz resonator 72/76, like that illustrated in FIG. 7, is used to provide internal capacitance. As noted previously, a Helmholtz resonator 72/76 can provide the same capacitance as a simple capacitor 32/36, but with smaller dimensions than the simple capacitor 32/36.

Recall that equation 8 gives the acoustic input impedance, $Z_R$, of a typical Helmholtz resonator. This expression can be simplified with certain approximations and rewritten in terms of $a_n$ and $\ell_n$ where n designates the subscript number 1, 2, or 3 identifying the first resonator cavity 34a, constriction 38, and the second resonator cavity 34b, respectively.

$$\omega C = a_1[a_2 t_1 t_3 - a_1 t_1 t_2 t_3]/[a_2 - a_1 t_1 t_2] \tag{11}$$

Recall from equation 8 above that $t_n = \tan \theta_n$ and $\theta_n = \omega \ell_n / V_T$ and $a_n = S_n/(\rho_{flu} V_T)$, where $S_n$ is the cross-sectional area of the fluid-containing portion of the designated cavity or constriction, $\rho_{flu}$ is the density of the fluid in the resonator, and $v_T$ is the velocity of the tube wave propagating in the resonator. Also, recall that the subscript n=1, 2, or 3 designates the first resonator cavity 34a, constriction 38, or second resonator cavity 34b, respectively.

Figure 8D:
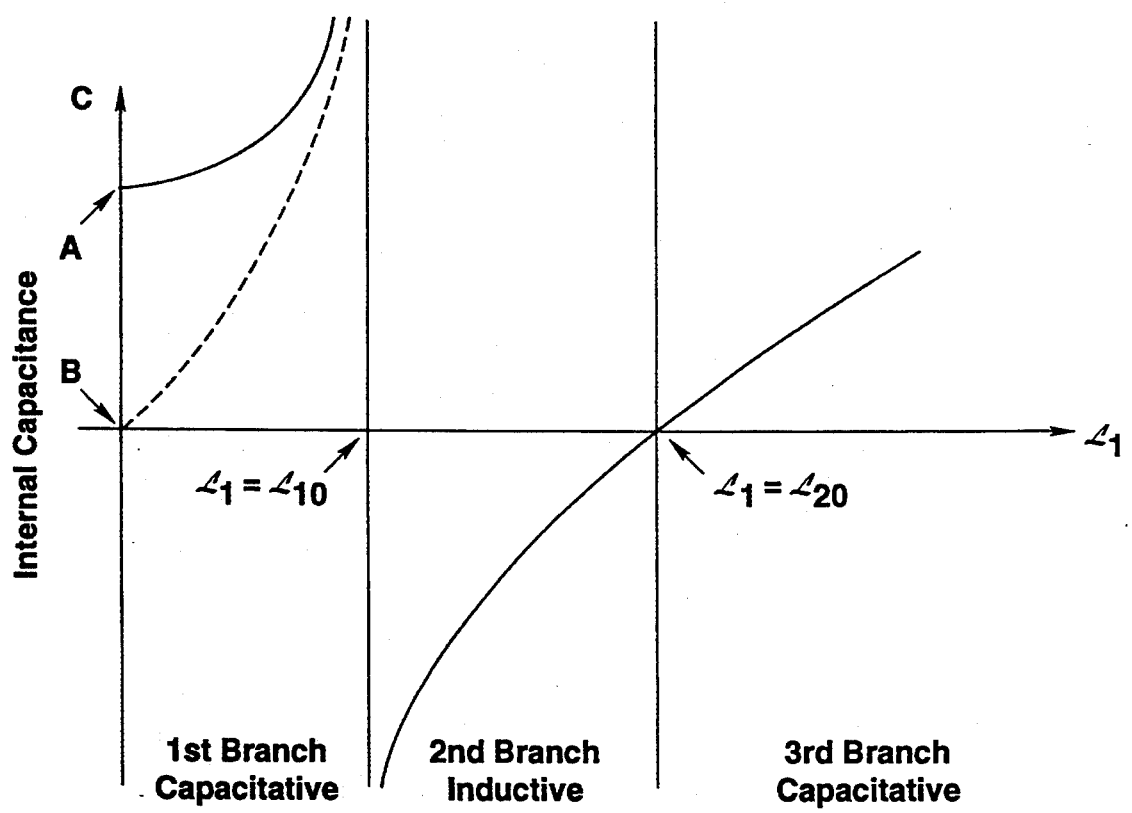
FIG. 8D graphically illustrates the relationship between the effective length, $l_1$, of an end chamber of a Helmholtz resonator and the capacitance, C, produced by the resonator.

The internal resonator 72b, 76b can be "tuned", that is C can be adjusted, by changing $\ell_1$, the effective length of the first cavity 34a of the resonator, as illustrated in FIG. 7. A sketch of the variation of the capacitance produced by the internal resonator 72b, 76b as a function of $\ell_1$ is shown in FIG. 8D. Referring to equation 11 and FIG. 8D we can see that C will be very large when $\ell_1$ is chosen to equal a value, $\ell_{10}$, satisfying the equation $a_2 = a_1 t_1 t_2$ and will be zero when $\ell_1$ is chosen to equal a value, $\ell_{20}$, satisfying $a_2(t_1 + t_3) = a_1 t_1 t_2 t_3$.

Under the first capacitative branch, a length slightly less than $\ell_{10}$ will correspond to a length for the first resonator cavity 34a which maintains resonance at some minimum frequency, $f_{min}$. Furthermore, when $t_1=0$, i.e. $\ell_1=0$, the resonator has a capacitance approximately given by $\omega C = a_1 t_3$. This point is identified as point A along the internal capacitance axis in FIG. 8D. As the length of the first resonator cavity 34a moves towards zero we obtain resonance at some frequency, $f_s$ less than $f_R$. However, the resonant frequency corresponding to $\ell_1=0$ can be increased to $f_R$ by modifying the Helmholtz resonator 72, 76 with a valve (not shown) which covers the resonator cavity 31 as the $\ell_1$ approaches zero. The dashed line in the first capacitative branch illustrates plot for such a modification. With this modification, the Helmholtz resonator con produce any required capacitance as $\ell_1$, varies from zero to $\ell_{10}$.

As the plot in FIG. 8D indicates the length of the first resonator cavity 34a, $\ell_1$, can be continuously varied over a relatively short range from $\ell_{10}$ to $\ell_{20}$ to enable the resonator to produce any required inductive impedance. This is a significant advantage for the Helmholtz resonator 72, 76.

The total length, $\ell_r$, of the Helmholtz resonator 72, 76 can be calculated using the following equation.

$$\ell_r = (2v_r/\pi_r)(a_2/a_1)^{\frac{1}{2}} \tag{12}$$

In equation 12, $v_r$ is the velocity of the tube wave propagating in the internal resonator 72b, 76b and $a_2$ and $a_1$ are defined above. Preferably, the value of $a_2/a_1$ is substantially less than one. However, the preferred ratio for $a_2/a_1$ will be application dependent. A very narrow diameter for constriction 38 would produce substantial frictional losses (see M. J. Lighthill, Waves in fluids, Cambridge Univ. Press, U.K. 1978 p.135) while a large diameter for constriction 38 would not allow the internal resonator 72b, 76b to obtain a strong inductance.

The fluid contained in the resonator 72, 76 may be either gas, oil, or water. Water is a preferred fluid because it has a low kinematic viscosity which thereby keeps frictional losses in the resonator 72, 76 relatively low.

In summary, we can see that equations 7b and 8 define the input impedance of a capacitor, $Z_C$, and resonator, $Z_R$, respectively, in terms of $\theta$ which contains the effective length of the capacitor cavity 34 or first resonator cavity 34a. To control the tube wave dominance effect, equations 7b or 8 can be used to identify the necessary capacitor or resonator cavity effective length for establishing a near zero impedance and hence an acoustic pressure null at or near the end of the apparatus. Alternatively, the equations 6a-c can be used to determine the necessary distances for positioning two end sources 22, 26 from the intermediate source 24 to control tube wave dominance through destructive interference.

The following series of relationships are useful in describing how the energy radiated at both resonant and nonresonant frequencies may be maximized for a given acoustic current where a large input impedance is experienced by the intermediate source 24. Equation 5c defines the power radiated, $W_{Rad}$, into the formation 11 as P- and S-waves in terms of pressure around the source, $P_o$, while equation 5d relates $P_o$ to the impedance seen around the source, $Z_o$. Equation 9a defines $Z_o$ in terms of an acoustic capacitance, C, in parallel with an acoustic resistance, R, and an acoustic inductance, L, in series with each other. Equation 7a defines $Z_C$, the capacitor input impedance, in terms of acoustic capacitance, C, and therefore may be used to relate an alternative expression for $Z_C$ (equation 7b), defined in terms of the effective length, $L_1$, of the capacitor cavity 34, to the acoustic capacitance term (in equation 9a) used to define $Z_o$. Recalling that $P_o = Z_o \times I_o$ (equation 5d), we can see how the effective length of the capacitor cavity 34 needed to maximize the acoustic pressure around the center of the source, $P_o$, can be determined with a given acoustic current, $I_o$, from the intermediate source 24.

The relationships discussed above are most applicable for the types of embodiments briefly described above. However, other embodiments may obtain different results or require different expressions, known to those skilled in the art, in defining the physical means used to maximize the energy efficiency of the apparatus. For instance, the form of certain expressions used above would change where different types of acoustic capacitors/resonators are used or where the acoustic capacitors/resonators contain a gas or a combination of gas and liquid rather than liquid. Nonetheless, the basic theory of operation outlined above would remain the same.

Also, end capacitors 32a, 36a or resonators 72a, 76a whose capacitance may be variably adjusted or "tuned" over a range of tube wave frequencies to produce the desired acoustic impedance for generating either a relative acoustic pressure maximum or minimum are not essential to practicing the invention. For instance, where the radiated energy is required for only a fixed resonant frequency the tuning capability may be unnecessary. Furthermore, the acoustic capacitance, C, of the internal capacitors 32b, 36b or resonators 72b, 76b may be "tuned" to maximize $P_o$ without using a movable internal piston 33.

The discussion under Description of Operational Principles has been in the context of placing a capacitance, C, in parallel with an inductance, L. It will be obvious, however, to those skilled in the art of acoustic engineering that the same principles could be applied where the capacitance, C, is in series with the inductance, L. Different mathematical relationships would arise from C and L being in a series arrangement. However, placing a capacitance and inductance in such a series arrangement can also produce a zero impedance condition around each end capacitor 32a, 36a or resonator 72a, 76a and/or maintain a resonant condition. In mechanical terms, a parallel arrangement allows tube waves to propagate by alternate pathways into and around the inventive apparatus, while a series arrangement provides only a single pathway for tube waves to propagate into the inventive apparatus.

These and other embodiments not discussed in detail may provide certain advantages under unique applications not considered herein. However, the embodiments of the apparatus discussed above and in greater detail below constitute the best mode currently known to the inventor for practicing the invention.

DESCRIPTION OF OPERATION

Figure 9:
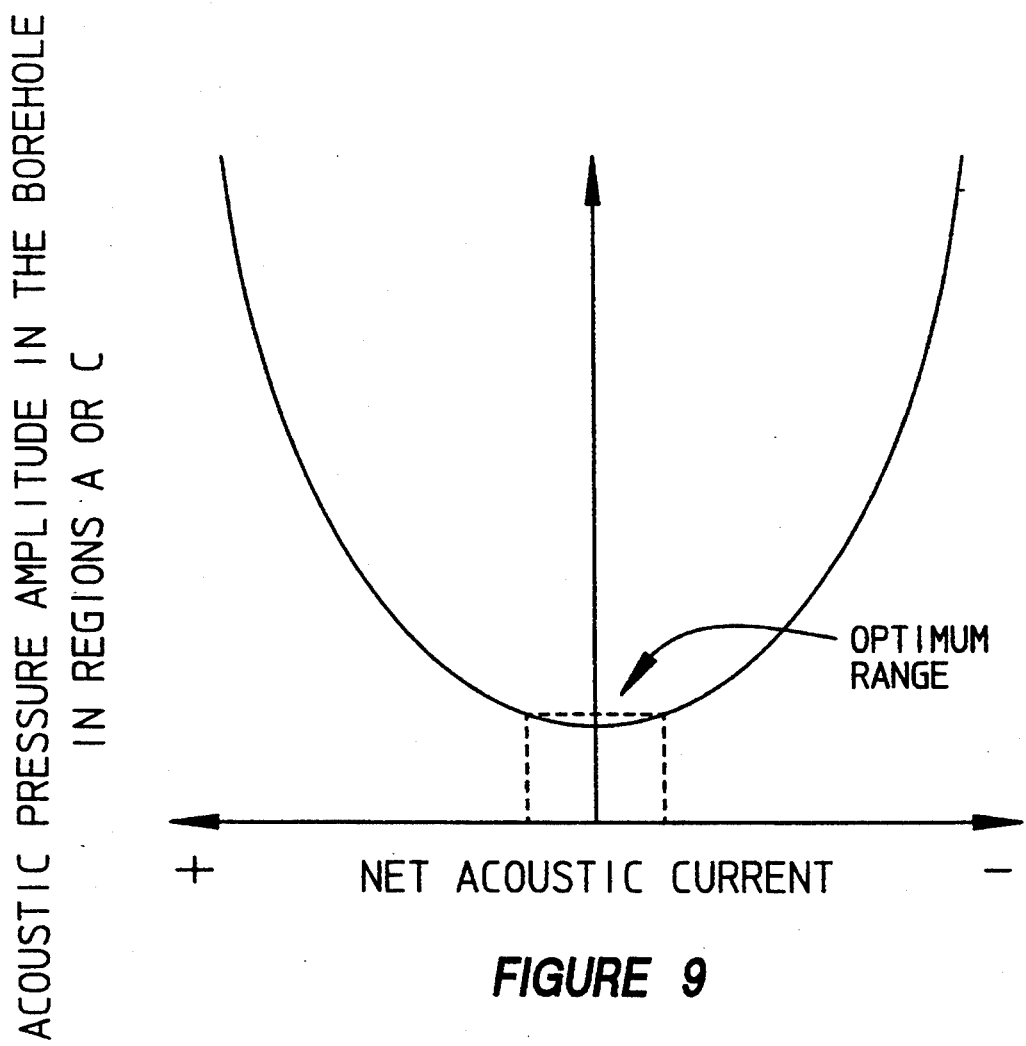
FIG. 9 graphically illustrates the relationship between the acoustic pressure amplitude of tube waves in selected regions of a borehole and the acoustic currents (i.e., fluid flow rates), $I_o$ and $I_{\frac{1}{2}}$, produced by three acoustic sources of a synchronized acoustic source.
Figure 10:
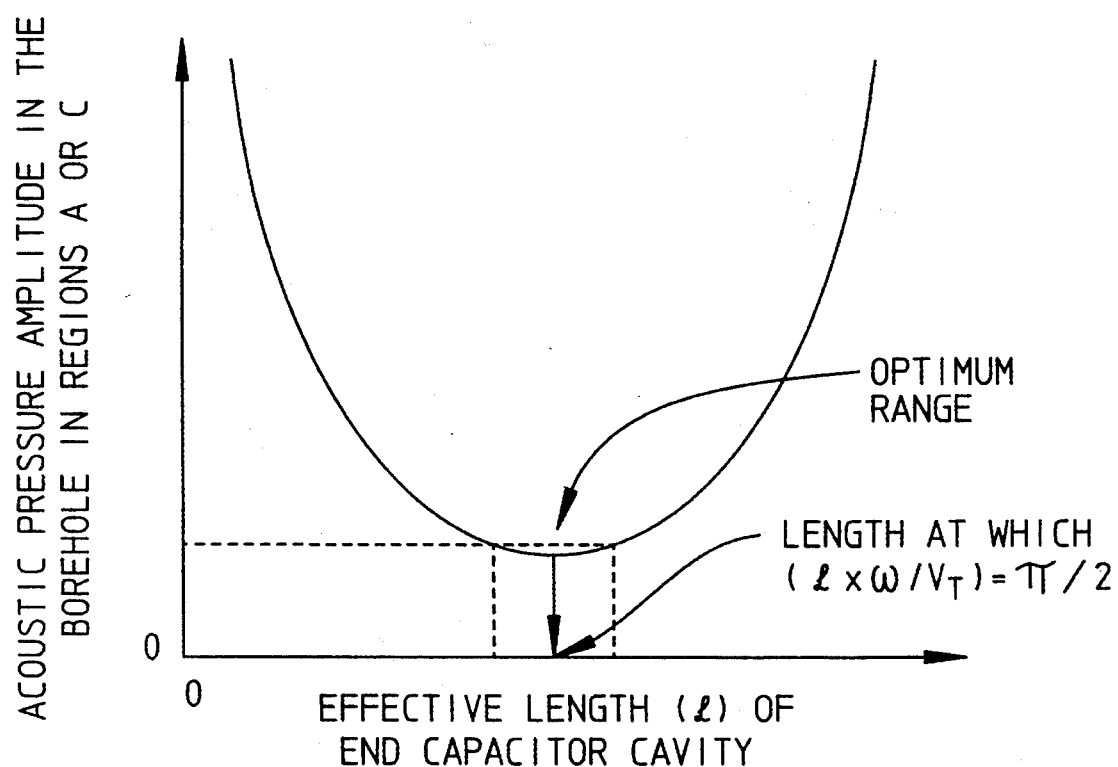
FIG. 10 graphically illustrates the relationship between the acoustic pressure amplitude of tube waves in the regions of a borehole beyond the ends of a synchronized acoustic source and the effective length of an end capacitor cavity.
Figure 11:
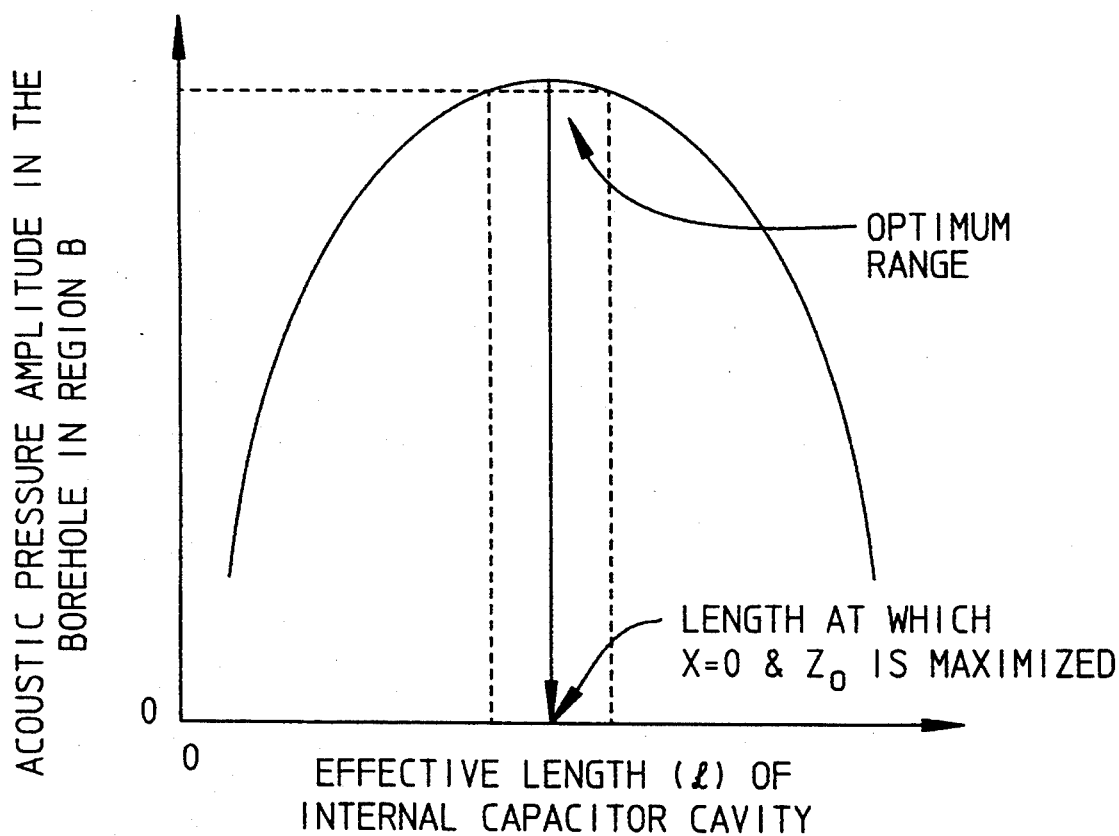
FIG. 11 graphically illustrates the relationship between the acoustic pressure amplitude of tube waves in the region of a borehole occupied by a synchronized acoustic source and the effective length of an internal capacitor cavity.

The description below will discuss the first two embodiments illustrated in FIGS. 1 and 2 using first and second end acoustic sources 22, 26, or end acoustic capacitors 32a, 36a or acoustic resonators 72a, 76a to mitigate the tube wave dominance effect discussed above. Subsequently, the second two embodiments illustrated in FIGS. 3 and 4 additionally having either internal acoustic capacitors 32b, 36b or resonators 72b, 76b will be described. These second two embodiments illustrate how P- and S-wave output may be maximized over a range of frequencies, whether resonant frequencies or not, and thereby eliminate the resonant frequency limitation effect. The operation of these and other apparent, but unillustrated, embodiments will be more easily understood by reference to FIGS. 9, 10, and 11 which correlate the acoustic pressure amplitude in identified regions of the borehole 10 with either the net acoustic current, $I_o + [2I_{\frac{1}{2}} \times \cos(\omega D_{\frac{1}{2}}/V_T)]$, (FIG. 9) or the effective length of the capacitor cavity 34 (FIGS. 10 and 11). The physical description of operation will begin, however, with a discussion of the acoustic sources 22, 24, 26 illustrated in FIG. 5, acoustic capacitor 32, 36 illustrated in FIG. 6 and the Helmholtz resonator 72, 76 illustrated in FIG. 7.

Acoustic Sources

Figure 5:
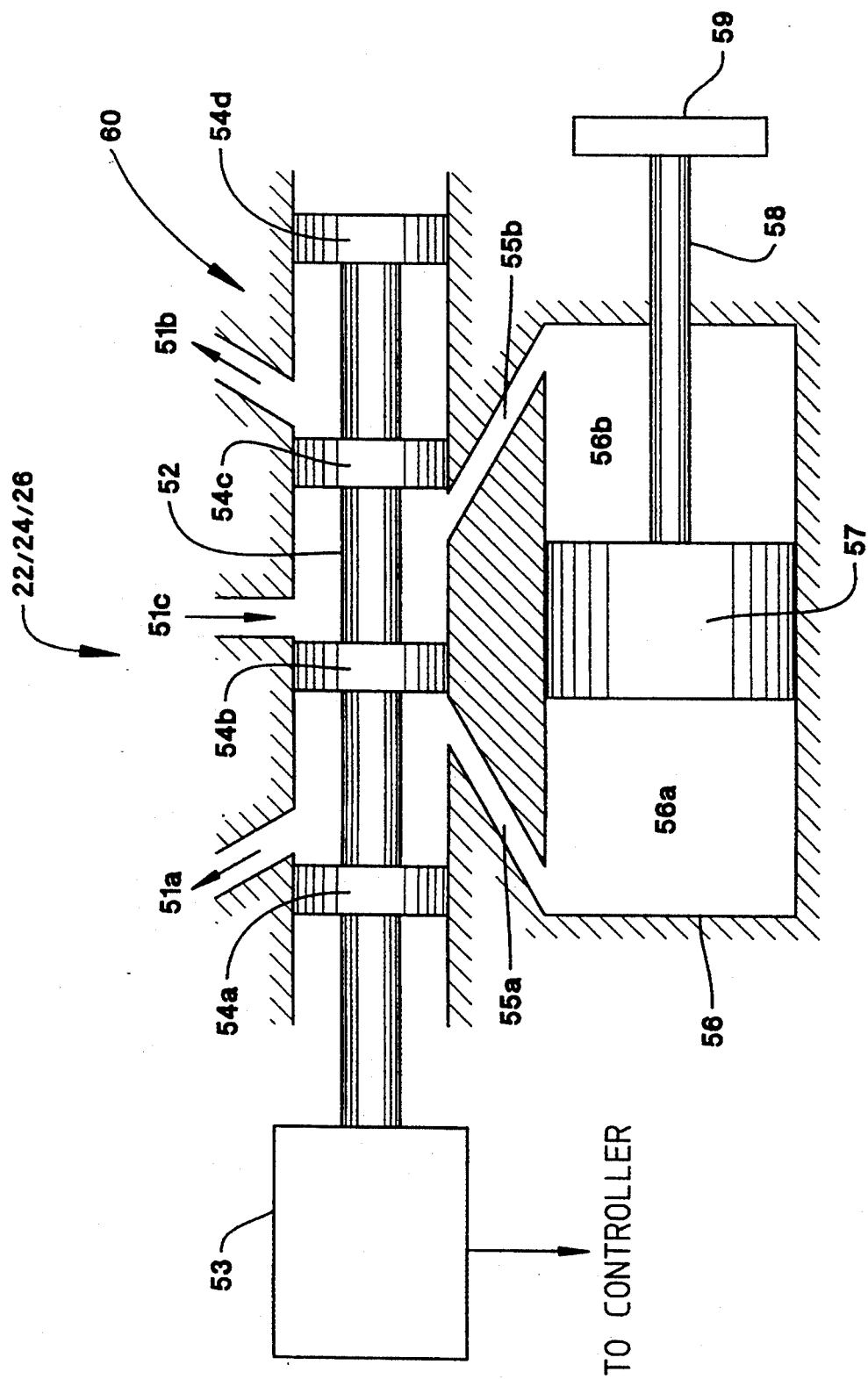
FIG. 5 (Prior Art) schematically illustrates a typical acoustic source adaptable for use in the inventive apparatus.

FIG. 5 schematically illustrates a typical acoustic source 22, 24, 26 suitable for adapting to the inventive apparatus either as an intermediate source 24 or an end source 22, 26. An acoustic source may be any device causing volume displacement in the fluid such as a piston driven by a hydraulic or electromechanical means.

A typical source 22, 24, 26 is comprised of valve assembly 60 and an acoustic source housing 56. The valve assembly 60 directs hydraulic oil flow into the source housing 56 so that the piston 57, shaft 58 and external plate 59 are reciprocated, thereby causing a volume displacement in the fluid (not shown) surrounding the source 22, 24, 26 as the housing piston 57 and shaft 58 reciprocate. Oil (not shown) occupies the void space of the valve assembly 60 and source housing 56.

The reciprocating action of the external plate 59 is induced as oil enters the hydraulic cylinder housing 56 via supply port 51c and sequentially exits the housing 56 via return ports 51a or 51b. The valve assembly 60 communicates with both the first and second chambers 56a and 56b of the source housing via the first and second housing ports 55a and 55b, respectively. The control valve shaft 52 is reciprocated by an electric solenoid 53 which in turn causes the actuator pistons 54b and 54c to reciprocate across the housing ports 55a and 55b. As such shifting occurs, oil enters one housing chamber, 56b as depicted, which pressurizes and pushes the housing piston 57 toward the opposing chamber, 56a as depicted. The movement of housing piston 57 towards the opposing chamber 56a forces oil to exit the housing chamber 56a via its corresponding housing port 55a and return port 51a. This oil flow cycle is repeated in the opposite direction when the electric solenoid 53 draws the actuator pistons 54b and 54c to the opposing side of housing ports 56a and 56b. The continuing repetition of each oil flow cycle produces a corresponding reciprocating action of the housing piston 57 and external plate 59. The electric solenoid 53 is connected to the controller 23a (shown in FIGS. 1-4) used for synchronizing the intermediate source 24 with end sources 22, 26 or controller 28 (shown in FIGS. 1 and 3 only) for maintaining equal acoustic currents between end sources 22, 26.

Another type of suitable acoustic source is a piston driven by a servo controlled hydraulic valve, such as those manufactured by Moog (Buffalo, New York), E-Systems (Salt Lake City, Utah), or MTS (Eden Prairie, Minn.). Other examples of acoustic sources, not illustrated but acceptable for use with the inventive apparatus, include piezoelectric crystal oscillators (e.g., see U.S. Pat. Nos. 4,525,645 and 4,996,674), magnetostrictive oscillators (e.g., see U.S. Pat. No. 4,682,308), or electromechanical actuators (e.g., see U.S. Pat. No. 4,834,210).

As noted previously, the velocity of a tube wave, $V_T$, produced by an acoustic source is usually constant throughout its propagation. Accordingly, an independent measurement of $V_T$ is normally not required under most applications. However, where the borehole has no casing a tube wave's velocity may vary significantly. In such an instance, the tube wave's velocity would require a separate measurement using, for example, a low frequency (i.e., about one kilohertz) monopole acoustic logging tool. The electronic signal corresponding to this measured velocity may then be directed to the appropriate controller 23a, 23b, or 28 (shown in FIGS. 1-4) described more fully below.

Acoustic Capacitors and Resonators

In considering now, both the end and internal capacitors 32a, 32b, 36a, 36b (generically referred to as 32, 36), it should be noted that the examples described below are not intended to be limiting, but provided for illustrative purposes. Other unillustrated acoustic capacitor designs may work with equal effect if properly adapted to operate in cooperation with the intermediate source 24. The simplest example of a fixed frequency acoustic capacitor would be a length of hollow pipe which is open at one end and closed at the other end.

As equation 7b indicates, however, an acoustic capacitor's input impedance, $Z_C$, will change with a change in the circular frequency, $\omega$, of the tube wave received by the capacitor 32, 36 unless the effective length, $l$, of the reservoir cavity 34 is changed to maintain $Z_C$ at the desired magnitude. As will be discussed below maintaining $Z_C$ at a predetermined magnitude is essential to (1) creating a zero or near zero impedance condition and thereby controlling the tube wave dominance effect and (2) producing the proper acoustic capacitance, C, for creating a large input impedance for the intermediate source 24 and thereby maximizing radiation efficiency for a given acoustic current. Therefore, for optimum seismic signal generation a tunable capacitor 32, 36 is preferable where the production of P- and S-waves over a frequency range is desirable. However, economic factors and the performance requirements dictated by the application of the apparatus may favor using one or more passive end acoustic capacitors 32a, 36a or resonators 72a, 76a. A passive acoustic capacitor or resonator means that the capacitor 32a, 36a or resonator 72a, 76a has a single preset and predetermined input impedance which is not variable with changes in tube wave frequency from the intermediate acoustic source, 24.

One example of a simple tunable capacitor 32, 36 is shown in FIG. 6. Such a capacitor 32, 36 is preferably constructed from a length of hollow pipe, closed at both ends. As illustrated, one or more apertures 31 are placed on the side of the pipe near one end to permit acoustic communication between the fluid (not shown) in the interior of the capacitor 32, 36 and the fluid in the borehole 10. An alternative not shown, could position the aperture 31 on the end of the pipe nearest the intermediate source 24. This aperture 31 provides an alternate path for fluid flow which thereby creates an acoustic capacitance in parallel with the acoustic inductance and resistance of the system. In some applications it may be desirable to keep the fluid inside the capacitor 32, 36 separate from the fluid in the borehole 10. In such cases each aperture 31 may be covered with a flexible diaphragm (not shown) which permits acoustic communication while preventing mixing of the fluid in the capacitor 32, 36 and the fluid in the borehole 10.

The capacitor 32, 36 is "tuned" preferably using an adjustable piston 33 whose position determines the effective length, $l$, of the capacitor's cavity 34. The piston 33 may be moved longitudinally along the capacitor's central axis 37 by a threaded screw type drive shaft 35. Preferably, the drive shaft 35 is adapted to adjust the position of the piston 33 in both a forward and backward direction along the capacitor's central axs 37. The drive shaft 35 is connected to a driving means, such as an electric motor 39, which is connected and responsive to a controller 23a, 23b (shown schematically in FIGS. 2-4) used for controlling the effective length of the capacitor cavity 34 in response to various acoustic pressure signal information.

As discussed above, both end and internal Helmholtz resonators 72a, 72b, 76a, 76b (generically referred to as 72, 76) provide a more compact means for introducing acoustic capacitance into the inventive apparatus. Also, as with the capacitors 32, 36, controlling and maintaining the input impedance of the resonator, $Z_R$, is critical to controlling the tube wave dominance effect or eliminating the resonant frequency limitation effect. Therefore, preferably, the resonator 72, 76 is engineered to be tunable, in the same manner as that described for capacitor 32, 36, so that the resonator 72, 76 can respond to a range of tube wave frequencies radiated from the intermediate source 24. Only the effective length of the first resonator cavity 34a is controlled, however, in response to acoustic pressure signal information received from the controller 23a, 23b.

The inventive apparatus preferably uses either "tunable" acoustic capacitors 32, 36 or resonators 72, 76 for controlling the tube wave dominance effect. However, under certain operational circumstances it may be desirable to use nontunable or passive capacitors 32, 36 or resonators 72, 76 for controlling the tube wave dominance effect. Such passive acoustic capacitors 32, 36 or resonators 72, 76 can produce a pressure null for most frequencies in a selected frequency range and thereby substantially reduce the tube wave dominance effect for most frequencies in the range. Also, tunable acoustic capacitors 32, 36 or resonators 72, 76 can still be used in conjunction with passive capacitors 32, 36 or resonators 72, 76 to eliminate the resonant frequency limitation effect or maintain a resonant condition for each frequency in the selected range.

Passive acoustic capacitors 32, 36 or resonators 72, 76, however, will produce a very high impedance at certain acoustic pressure wave frequencies. From the equation 7b above under Description of Operational Principles we know that the input impedance, $Z_c$, is directly proportional to the cotangent of $\theta$. Recall that $\theta = (l \times \omega / V_T)$, $\omega = 2\pi f$ and $V_T = \lambda \times f$, so $\theta$ may be expressed in terms of the wavelength, $\lambda$, of the acoustic pressure wave propagating in the acoustic capacitors 32, 36 or resonators 72, 76. Consequently, $\theta$ also equals $(l \times 2\pi / \lambda)$. Therefore, where the effective length of the capacitor cavity 34 in the internal capacitors 32b, 36b or resonators 72b, 76b is equal to any half integer or full integer multiple of $\lambda$, $\theta$ becomes a full integer multiple of $\pi$ (i.e., $\pi$, $2\pi$, $3\pi$, ... $n\lambda$). The cotangent of $\pi$ or any other full integer multiple of $\pi$ is infinity. Therefore, there are selected frequencies at which $Z_c$ becomes very large and the acoustic pressure wave seeks a path of lower resistance around the acoustic capacitors 32, 36 or resonators 72, 76. At such frequencies the tool ceases to produce resonant oscillations in the borehole and the power radiated drops significantly.

Also, under certain operating conditions it may be preferable to provide a cooling means (not shown), such as a circulating cooled liquid, to reduce any heating effect that could arise during long term operation of capacitors 32, 36 or resonators 72, 76. Such a heating effect could degrade the performance of capacitors 32, 36 or resonators 72, 76 as result of heat deterioration of their components.

First Embodiment

We now consider the operation of the first embodiment 20 of the invention which uses an array of three acoustic sources 22, 24, 26 to control the tube wave dominance effect. Referring first to FIG. 9, the plot provides a graphic illustration of the relationship between acoustic pressure amplitude and acoustic current in controlling the tube wave dominance effect at a fixed tube wave frequency. The vertical axis indicates the acoustic pressure amplitude of tube waves in regions A or C of borehole 10 using first and second end sources 22, 26 to produce a destructive interference effect with the output of intermediate source 24. The horizontal axis indicates a range of positive and negative values for the sum of the acoustic current terms identified in equation 6d, $I_o + [2I_{\frac{1}{2}} \times \cos(\omega D_{\frac{1}{2}} / V_T)]$, which we refer to as the net acoustic current. The acoustic pressure, P, in a region of the borehole 10 is directly proportional to the acoustic pressure amplitude of the tube wave propagating therethrough. Consequently, as the acoustic pressure amplitude approaches zero so does the acoustic pressure in that particular region of the borehole.

As the plot in FIG. 9 indicates, the acoustic pressure amplitude of tube waves in regions A or C of borehole 10 obtains a near zero value where the net acoustic current is nearly zero. Ideally, if a zero value for the net acoustic current is obtained then the acoustic pressure amplitude of the tube waves in regions A and C should become zero and hence the tube waves produced by the synchronized acoustic source 20 should be completely canceled. In practice, however, a zero value for the acoustic pressure amplitude is normally unobtainable owing to leakage effects around the seals in the sources 22, 24, 26 or controller error producing slight differences in the circular frequency of the tube wave, $\omega$, generated by each source 22, 24, 26. Therefore, some minimum, unwanted acoustic pressure amplitude is normally maintained in regions A and C of borehole 10. This, however, does not significantly impair the utility of the inventive source.

By synchronizing the respective fluid flow rates (i.e., acoustic currents) of the acoustic sources 22, 24, 26 to produce an acoustic pressure amplitude in borehole region A and C at or near the minimum point of the plot in FIG. 9 substantially all of the tube waves produced by the synchronized acoustic source 20 are canceled before entering regions A and C. Accordingly, only a small portion of the tube waves produced by the synchronized acoustic source 20 are propagated in regions A and C of the borehole. The tube wave dominance effect is thereby substantially eliminated when the array of acoustic sources 22, 24, 26 cooperate to produce a combined acoustic current at or near this minimum.

Turning now to FIG. 1 we discuss how the first and second end acoustic sources 22, 26 and the intermediate acoustic source 24, positioned therebetween, cooperate to substantially eliminate the tube wave dominance effect and thereby produce, at resonant frequencies, an enhanced acoustic signal for geophones 15 situated on the earth's surface 12 (or in a neighboring borehole, not shown). Preferably, the intermediate acoustic source is positioned equidistant from each end acoustic source 22, 26, but may be positioned at any point between the end sources. Also, under certain applications it may be desirable to use multiple intermediate sources 24. To simplify the discussion of the first embodiment, however, an application using only one intermediate source 24 and two end acoustic sources 22, 26 will be discussed.

The particular construction and actuation of acoustic sources 22, 24, 26 is not critical to the operation of the synchronized acoustic source 20 provided such sources can radiate sound waves at one or more frequencies and are adaptable to the borehole casing 14 in which they are being used. Preferably, the intermediate source 24 is adaptable to having its energy output monitored and controlled by a servomechanism 16a while end sources 22, 26 are adaptable to at least one controller 28 to substantially match their respective fluid flow rates.

The servomechanism 16a of FIG. 1 disposed in borehole casing 14 is comprised of a first controller 23a, acoustic pressure sensors 21a, and communication links 25a for interconnecting each acoustic pressure sensor 21a to the first controller 23a and intermediate source 24. Preferably, each acoustic pressure sensor 21a is positioned adjacent to each end of region B, respectively, but should not be placed in region B. A typical acoustic pressure sensor 21a which could be adapted to the inventive apparatus is a hydrophone, while a microprocessor would be a suitable controller 23a for receiving the acoustic pressure signal information converted to an electrical signal by each acoustic pressure sensor 21a.

An optional second controller 28 with communication links 29 may also be used to ensure that the respective fluid flow rates or acoustic currents, $I_1$, $I_2$, of the each end source 22, 26 is maintained at substantially equal values. The second controller 28 synchronizes the flow rates of each end source 22, 26 preferably by transmitting its control signals via communication links 29 extending between itself and each end source 22, 26. Alternatively, the controller 28 and its communication links 29 can be omitted provided each end source 22, 26 is preprogrammed so that their respective output acoustic currents, $I_1$, $I_2$, are substantially equal in amplitude and phase.

The fluid flow rate or acoustic current, $I_o$, of the intermediate source 24 is maintained by the controller 23a to produce acoustic pressure, P, at or near zero in regions A and C of the borehole over a range of tube wave frequencies. However, absent any internal acoustic capacitance, only certain resonant frequencies will maximize the energy emitted by the intermediate source 24 for a selected acoustic current. The controller 23a is responsive to the acoustic pressure signal information transmitted to it via communication links 25a by acoustic pressure sensors 21a. With such information the controller 23a corrects the fluid flow rate, $I_o$, of the intermediate source 24 via communication link 27a to maintain the acoustic pressure amplitude at or near the minimum of an acoustic pressure amplitude/acoustic current curve similar to that shown in FIG. 9.

Alternatively, acoustic pressure sensors 21a and communication links 25a can be omitted, provided the controller 23a is preprogrammed with the fluid flow rate, $I_1$, $I_2$, and the cosine term, $\omega D_{\frac{1}{2}}/V_T$, of equation 6d produced by each end source 22, 26 for each frequency of tube wave produced. Controller 23a can thereby adjust the fluid flow rate, $I_o$, of the intermediate acoustic source 24 to maintain a zero or near zero value for equation 6d. However, using servomechanism 16a is preferable because of its ability to continually compensate for operational variances (e.g., fluid leakage, frequency differences, etc.).

Preferably, each end source 22, 26 is substantially equidistant from the intermediate source 24. However, the synchronized acoustic source 20 can operate where the end sources 22, 26 are positioned at unequal distances from the intermediate source 24. Under such an operating condition, however, the end sources 22, 26 and intermediate source 24 must cooperate so as to simultaneously satisfy equations 6a–c for substantially eliminating the tube wave dominance effect.

As FIG. 1 indicates, the length of region B is defined by the distance from the outside end of a first end source 22 to a second end source 26. The distance that end sources 22, 26 are placed from the intermediate source 24 is not critical to the performance of the synchronized acoustic source 20 or other embodiments of the synchronized acoustic source to be discussed below. This distance is determined by the need for the synchronized acoustic source to act as a point source. Therefore, preferably, the length of region B will be about one-half of the wavelength of the tube wave produced by the intermediate source 24 so that the synchronized acoustic source 20 operates at a fundamental resonant frequency or a odd integer multiple of such frequency. Where it is desirable for the synchronized acoustic source 20 to operate over a range of frequencies, the resonant frequency condition could be maintained if the end sources 22, 26 were moved longitudinally to either lengthen or shorten region B in accordance with the wavelength of the tube wave produced by the intermediate source 24. However, preferably, internal acoustic capacitance is added in parallel to overcome the resonant frequency limitation effect. Coupling internal acoustic capacitance with acoustic sources 22, 24, 26 will be discussed below in the context of the third embodiment.

Controllers 23a and 28 may be any of a number of commercially available microprocessor based devices, as will be readily apparent to those skilled in the art. Accordingly, these controllers will not be further described herein.

Second Embodiment

A second embodiment of the synchronized acoustic source 30 disposed in a borehole casing 14 is illustrated in FIG. 2. This embodiment is comprised of a pair of acoustic end capacitors 32a, 36a, or, preferably, end resonators 72a, 76a and an intermediate acoustic source 24 positioned therebetween, which cooperate to substantially eliminate the tube wave dominance effect and thereby produce, at resonant frequencies, an enhanced acoustic signal for geophones 15 situated on the earth's surface 12 (or in a neighboring borehole, not shown). For convenience of discussion, hereafter where end acoustic capacitance is required only end resonators 72a, 72b will be discussed, although end capacitors 32a, 36a may be equally effective. Accordingly, both types of acoustic capacitance producing devices are designated where appropriate in the attached illustrations.

Preferably, the intermediate acoustic source 24 is positioned equidistant from each end resonator 72a, 76a, but may be positioned at any point between the end resonators 72a, 76a. Also, under certain applications it may be desirable to use multiple intermediate sources 24. To simplify discussion of the second embodiment, however, an application using only one intermediate source and two end resonators 72a, 76a will be discussed.

End resonators 72a, 76a reduce or eliminate the tube wave dominance effect by producing a zero or near zero impedance condition, and hence an acoustic pressure null, around and beyond each end of the synchronized acoustic source 30. The effect of a zero impedance condition on the acoustic pressure in borehole 10 arising from tube waves can be better understood by referring to equations 1 and 7b above. Recalling the relationship between acoustic impedance, Z, and acoustic pressure, P, identified in equation 1, we know that the value for P is directly proportional to Z. So, as the input impedance, $Z_R$ for end resonators 72a, 76a, or $Z_C$ for end capacitors 32a, 36a, approaches zero the corresponding acoustic pressure observed around and beyond the respective ends of the synchronized acoustic source 30 also approaches zero. For example, considering equation 7b we know that the input impedance of the capacitor, $Z_C$, will equal zero where the cotangent of ($\mathcal{L} \times \omega/V_T$) is equal to zero. The cotangent term will equal zero for $\pi/2$ or any of its odd integer multiples (i.e., $3\pi/2$, $5\pi/2$, etc.).

Referring to FIG. 8 the plot of cotangent $\theta$ versus $\theta$ (i.e., $\mathcal{L} \times \omega/V_T$) graphically illustrates how the cotangent term is zero or near zero for values at or around $\pi/2$ or for odd integer multiples of $\pi/2$. Also, the velocity of the tube waves, $V_T$, is approximately constant for any given borehole with a casing (i.e., is almost independent of formation P- and S-wave velocities and formation density). For tube waves propagating through water or drilling fluids $V_T$ is typically about 4,500 ft/sec. Therefore, for each tube wave circular frequency, $\omega$, the capacitor's effective length, $\mathcal{L}$, can be adjusted to obtain a cotangent term, $(\mathcal{L} \times \omega/V_T)$, equal to or about equal to $\pi/2$ or its odd integer multiples, thereby producing a zero or near zero input impedance condition. Hence, the tube wave dominance effect is controlled over all frequencies. Recall from previous discussion, however, that only a predetermined $\omega$ having a corresponding wavelength which is twice the length of the apparatus will produce a resonant frequency. Consequently, the power radiated for a given acoustic current will be maximized only at selected resonant frequencies.

FIG. 10 provides a graphic illustration between acoustic pressure amplitude of tube waves having a fixed circular frequency, $\omega$, in regions A and C of the borehole 10 (plotted on the vertical axis) versus the effective length, $\mathcal{L}$, of an end capacitor (plotted on the x-axis). As the plot illustrates, the curve has a minimum point which has a y-coordinate that is near zero. So the corresponding x-coordinate for that minimum point is an effective length which produces a value of about $\pi/2$ for the cotangent term, $(\mathcal{L} \times \omega/V_T)$. As discussed under the first embodiment, only ideal components and operating conditions would permit obtaining the theoretical zero tube wave pressure amplitude. In practice, however, the wall elasticity of the end capacitor 32a, 36b or end resonator 72a, 72b and fluid leakage effects can interfere with obtaining a zero input impedance, $Z_C$ or $Z_R$, and hence a zero acoustic pressure amplitude. Accordingly, the plot illustrated in FIG. 10 depicts a minimum acoustic pressure amplitude for tube waves in regions A and C near zero but not at zero.

Because the acoustic pressure amplitude at a given point in the borehole 10 is directly proportional to the impedance at that point, a minimum acoustic pressure amplitude can be maintained with a near zero impedance. As noted above, preferably this near zero impedance is maintained by changing the effective length of the capacitor cavity 34 to produce a value of $(\mathcal{L} \times \omega/V_T)$ near or about equal to $\pi/2$. In the case of an end resonator 72a, 76a the input impedance $Z_R$ approaches zero as the numerator of equation 8 approaches zero. A means for monitoring the acoustic pressure around the ends of the apparatus as an indicator of the impedance in the region and thereby controlling the length of the first resonator cavity 34a is preferable.

Referring back to FIG. 2, servomechanism 16a provides the means for synchronizing the function of end resonators 72a, 76a or end capacitors 32a, 36a with intermediate source 24 to produce a near zero acoustic pressure amplitude in regions A and C. The servomechanism 16a comprising acoustic pressure sensors 21a, controller 23a, and communication links 25a is preferably used to maintain a near zero input impedance, $Z_C$, for each end capacitor 32a, 36a or near zero input impedance, $Z_R$, for each end resonator 72a, 76a.

The controller 23a controls the effective length of the capacitor cavity 34 or first resonator cavity 34a in response to the acoustic pressure signal information transmitted to controller 23a from acoustic pressure sensors 21a via communication links 25a. When the acoustic pressure amplitude of the tube waves in region A or C increases above some relative minimum point or a range around such minimum, as identified in FIG. 10, the controller 23a adjusts the effective length of the capacitor cavity 34 or first resonator cavity 34a to restore the minimum acoustic pressure condition. This continuous monitoring and control by the servomechanism 16a can occur over a range of tube wave frequencies produced by the intermediate source 24.

Alternatively, the servomechanism can be omitted and each end capacitor 32a, 36a or resonator 72a, 76a can be preprogammed with each circular frequency of the tube wave, $\omega$, produced by the intermediate source 24 and sweep rate at which the circular frequency is produced. Because $V_T$ is approximately constant (i.e., about 4,500 ft/sec) and the tube wave circular frequency, $\omega$, can be predetermined, the effective length, $\mathcal{L}$, of each end capacitor cavity 32a, 36a can be preprogrammed to yield a near zero input impedance condition. Theoretically, such a preprogramming technique should also maintain a relative minimum acoustic pressure amplitude for tube waves in regions A and C of borehole 10. However, over the useful life of the synchronized acoustic source 30, various operational variances will arise as capacitor leakage and wall elasticity effects become more pronounced with time. For example, as such effects become more pronounced, the relationship expressed in equation 7b is less accurate, and therefore the correlation between the effective length of capacitor cavity 34 or first resonator cavity 34a and input impedance, $Z_C$ or $Z_R$, is less reliable. Accordingly, a synchronized acoustic source using end capacitors 32a, 36a or resonators 72a, 76a is preferably assembled using a servomechanism 16a for controlling such acoustic devices.

Third and Fourth Embodiments

Turning now to overcoming the resonant frequency limitation effect, we consider a third and fourth embodiment of the synchronized acoustic source 40 and 50, each disposed in a borehole casing 14, illustrated in FIGS. 3 and 4, respectively. With respect to controlling the tube wave dominance effect, each of these embodiments 40 and 50 operates substantially the same as its corresponding counterpart described under the first and second embodiments 20 and 30, respectively. The third and fourth embodiments 40 and 50, additionally use internal capacitors 32b, 36b or, preferably, internal resonators 72b or 76b, which cooperate with intermediate source 24 to substantially overcome the frequency limitation effect. Such capacitors 32b, 36b or resonators 72b, 76b thereby enable the apparatus 40 or 50 to produce an enhanced acoustic signal, at nonresonant as well as resonant frequencies, for geophones 15 situated on the earth's surface 12, in at least one neighboring borehole (not shown), or in the borehole 10 containing the apparatus 40 or 50.

Therefore, the following description of operation for the third and fourth embodiments will focus on introducing internal acoustic capacitance into the synchronized acoustic source 40, 50. This internal acoustic capacitance is introduced in the form of internal capacitors 32b, 36b or, preferably, internal resonators 72b, 76b to produce a large input impedance, $Z_o$, experienced by the intermediate source 24. This large input impedance thereby allows intermediate source 24 to maximize its energy output for a given acoustic current at nonresonant, as well as resonant frequencies. Preferably, the intermediate acoustic source 24 is positioned equidistant from each internal resonator 72b, 76b, but may be positioned at any point between the internal resonators 72b, 76b. Also, under certain applications it may be desirable to use multiple intermediate sources 24 or to use only a single internal resonator 72b or 76b. However, to simplify discussion, the third and fourth embodiments will be discussed using only one intermediate source and two internal resonators 72b, 76b.

As discussed previously, the resonators 72a, 72b, 76a, 76b (as illustrated in FIG. 7) are preferred because they are more compact than the simple capacitors 32a, 32b, 36a, 36b (as illustrated in FIG. 6). Therefore, except for reference to the effective length of a capacitor cavity 34 in FIGS. 10 and 11, the description will typically refer only to resonators 72a, 72b, 76a, 76b. However, capacitors 32a, 32b, 36a, 36b and other capacitors known to those skilled in the art also may be used in constructing a synchronized acoustic source 40, 50 with substantially equivalent effect.

From equations 9a, 9c and 9e we know that the input impedance, $Z_o$, experienced by the intermediate source 24 becomes substantially larger by adding an internal acoustic capacitance in parallel with an acoustic resistance and inductance in series with each other. Furthermore, from equation 5d we know there is a direct relationship between the acoustic pressure, $P_o$, seen by the intermediate source 24 and $Z_o$. Accordingly, the internal resonators 72b, 76b can be controlled by monitoring the acoustic pressure around the intermediate source 24 and using the detected acoustic pressure to control the effective length of first resonator cavity 34a for producing the acoustic capacitance, C, needed to maximize $P_o$. Alternatively, where the effective length of first resonator cavity 34a is fixed, the distance between the intermediate source 24 and the internal resonators 72b, 76b may be controlled to produce the acoustic capacitance necessary for maximizing $P_o$ for a given acoustic current.

FIG. 11 provides a graphic illustration of the acoustic pressure amplitude of tube waves having a fixed circular frequency, $\omega$, in region B of the borehole 10 (plotted on the vertical axis) versus the effective length, $\ell$, of an internal capacitor cavity 34 (plotted on the horizontal axis). As the plot illustrates, the curve has a maximum point which corresponds to an acoustic pressure amplitude in region B at which the effective length of the capacitor cavity 34 or first resonator cavity 34a produces a maximum input impedance, $Z_o$, experienced by the intermediate source 24 for a given acoustic current. Recall from the discussion above under Operational Principles that the reactance, X, approaches zero as the acoustic capacitance, C, approaches the value of the term $L/(R^2+\omega^2L^2)$ (see equation 9d). Therefore, in the embodiments discussed below, when $Z_o$ is maximized for a given acoustic current the reactance term of equation 5c, X, is near zero.

FIG. 3 schematically illustrates how internal resonators 72b, 76b are positioned about the intermediate source 24 for providing an internal acoustic capacitance, C, in parallel with an acoustic inductance and resistance in series with each other for producing a reactance, X, near zero. The parallel acoustic capacitance is provided by the presence of the aperture 31 (see FIGS. 6 and 7) which provides a second fluid flow pathway. Consequently, fluid may flow simultaneously through the annular area around the capacitor and into the internal resonator 72b, 76b.

As noted above, under these preferred embodiments, when $Z_o$ is maximized the reactance, X, is ideally zero. Obtaining a zero reactance, however, is complicated by capacitor or resonator leakage and wall elasticity effects.

In practice a maximum $Z_o$ for a given acoustic current is maintained by preferably using a servomechanism 16b to control a first and second internal resonator 72b, 76b. As described above, the servomechanism 16b is comprised of two acoustic pressure sensors 21b, a controller 23b positioned therebetween, and communication links 25b for connecting the controller 23b to each internal resonator 72b, 76b. The components of the servomechanism 16b used to control the internal resonators 72b, 76b are structurally substantially similar to those used for the servomechanism 16a as described above under the first and second embodiments. However, servomechanism 16b is programmed to control the internal resonators 72b, 76b to maximize $Z_o$ for a given acoustic current, while servomechanism 16a is programmed to control either intermediate source 24 or end resonators 72a, 76a for reducing the tube wave dominance effect. Preferably, both servomechanisms 16a and 16b and their respective acoustic components are operated independently of each other so that the tube wave dominance effect and $Z_o$ can be independently controlled.

Referring to FIG. 3, the acoustic pressure sensors 21b are positioned in region B of the borehole 10, preferably near its center. Each acoustic pressure sensor 21b is positioned between the intermediate source 24 and internal resonators 72b, 76b, respectively. Also, each internal resonator 72b, 76b must be positioned between the intermediate source 24 and an end source 22, 26. Preferably each internal resonator 72b, 76b is positioned at a substantially equal distance from the intermediate source 24. However, the synchronized acoustic source 40, 50 can function with each internal resonator 72b, 76b at different distances from the intermediate source 24.

Each internal resonator 72b, 76b is responsive to the control signals transmitted by the controller 23b via communication links 25b. The control signals produced by the controller 23b are produced in response to the signals arising from the acoustic pressure detected by acoustic pressure sensors 21b in region B of borehole 10. As discussed above, we know $Z_o$ and $P_o$ are maximized when the acoustic pressure amplitude in region B of the borehole 10 is maximized for a given acoustic current. As acoustic pressure sensors 21b detect a reduced acoustic pressure in region B of borehole 10 corresponding signals are transmitted to the controller 16b via communication links 25b. In response to the signals from acoustic pressure sensors 21b, the controller 23b transmits signals to each internal resonator 72b, 76b for adjusting the effective length, $\ell_1$, of each resonator's first resonator cavity 34a. Such signals from the controller 23b adjust the effective length, $\ell_1$, of the first resonator cavity to produce an acoustic capacitance in accordance with equation 9d and a $Z_o$ in accordance with equation 9e. Therefore, as the acoustic pressure sensors 21b detect a drop in the acoustic pressure in region B the controller 23b provides the appropriate signal for adjusting the length of the first resonator cavity 34a and thereby the acoustic capacitance of each internal resonator 72b, 76b to maintain $Z_o$ and hence, $P_o$ at its maximum for a given acoustic current.

In the case of both the third and fourth embodiment, maximizing $P_o$ ensures that the intermediate source 24 can maximize the energy radiated for given acoustic current for nonresonant, as well as, resonant frequencies. At the same time, the tube wave dominance effect is controlled, in the case of the third embodiment, by controlling the acoustic current of intermediate source 24 and synchronizing that acoustic current with the acoustic current of the end sources 22, 26 to produce a destructive interference effect, as described under the first embodiment. In the case of the fourth embodiment, the tube wave dominance effect is controlled by maintaining the input impedance, $Z_R$, of each end resonator 72a, 76a, at or near zero, as described under the second embodiment.

Although not preferable, as discussed under the first and second embodiments, the invention can function without certain components. For example, the third and fourth embodiments of the synchronized acoustic source 40 and 50 can be operated without servomechanisms 16a, 16b, controller 28 and communication links 29. In such a case the internal resonators 72b, 76b, intermediate source 24, and end sources 22, 26 or end resonators 72a, 76a are preprogrammed for each frequency to be produced by intermediate source 24 so as to produce the necessary internal acoustic capacitance for maximizing $Z_o$ and necessary acoustic current, $I_o$, or input impedance, $Z_R$, for controlling the tube wave dominance effect.

Controlling Bandwidth of Operation

As discussed above under the Description of Operational Principles, a resonant condition between the borehole fluid (not shown) and the internal capacitors 32b, 36b or resonators 72b, 76b can be maintained by controlling the effective length, $\ell$, of the capacitor cavity 34. Recall from that discussion there are two methods which can be used for maximizing the bandwidth of frequencies produced by the intermediate source 24: the jump method and the continuous method. Both types of methods are adaptable to any embodiment of the inventive apparatus using an internal capacitance to maintain the resonant condition at all frequencies in the bandwidth defined by some initial frequency, $f_{min}$, and some final frequency, $f_{max}$, where $f_{min}$ is less than the half wave resonance frequency, $f_R$, and $f_{max}$ is greater than $f_R$.

The simple internal capacitors 32b, 36b will be used in this operational description in order to simplify the discussion. As mentioned previously under the discussion of FIG. 8C, in the case of the jump method, $\ell_1$ ranges from some predetermined length, x, to zero where each $\ell_1$ corresponds to some frequency, f, in the first part of the bandwidth where $f_{min} \leq f \geq f_R$. The value for $\ell_1$ then increases to some predetermined length, y, which is greater than x and ranges from y to y−x, where each $\ell_1$ corresponds to some frequency, f, in the second part of the bandwidth where $f_R \leq f \geq f_{max}$.

Turning to FIG. 6, the adjustable piston 33 is positioned at a point in the capacitor cavity 34 to produce a $\ell_1 = x$ which provides a capacitance, $C_{max}$, for producing a resonant condition at $f_{min}$. As the intermediate source 24 progresses to higher frequencies the adjustable piston 33 incrementally moves towards the aperture 31 to produce progressively smaller positive capacitances for maintaining a resonant condition at each frequency. When the intermediate source 24 reaches a half wave resonance frequency, $f_R$, the internal capacitance and the $\ell_1$ produced by each internal capacitor 32b, 36b is zero. After reaching $f_R$ the adjustable piston 33 "jumps" backward by some distance to produce a $\ell_1 = y = V_c/2f_R$, where $v_c$ is the velocity of the tube wave in the capacitor cavity 34. The adjustable piston 33, again, incrementally moves towards the aperture 31 to produce progressively larger negative capacitances for maintaining a resonant condition at each frequency up to $f_{max}$. When $\ell_1 = y - x$ the internal capacitors 32b, 36b will produce the capacitance required, $-C_{max}$, for maintaining a resonant condition at $f_{max}$.

Referring back to FIG. 8C, recall that in the case of the continuous method, $\ell_1$ ranges from some predetermined length, y+x, to y. Each $\ell_1$ corresponds to some frequency, f, in the first part of the bandwidth where $f_{min} \leq f \geq f_R$. In the second part of the bandwidth where $f_R \leq f \geq f_{max}$ each $\ell_1$ corresponds a length in the from y to y−x, respectively.

Turning back to FIG. 6, the adjustable piston 33 is positioned at a point in the capacitor cavity 34 to produce a $\ell_1 = y + x$ which provides a capacitance, $C_{max}$, for producing a resonant condition at $f_{min}$. As the intermediate source 24 progresses to higher frequencies the adjustable piston 33 incrementally moves towards the aperture 31 to produce progressively smaller positive capacitances for maintaining a resonant condition at each frequency. When the intermediate source 24 reaches a half wave resonance frequency, $f_R$, the internal capacitance produced by each internal capacitor 32b, 36b is zero and $\ell_1 = y$. After reaching $f_R$ the adjustable piston 33 continues to incrementally move towards the aperture 31 to produce progressively larger negative capacitances for maintaining a resonant condition at each frequency up to $f_{max}$. When $\ell_1 = y - x$ the internal capacitors 32b, 36b will produce the capacitance required, $-C_{max}$, for maintaining a resonant condition at $f_{max}$. As discussed on page 16, inductance is a positive imaginary impedance and capacitance is a negative imaginary impedance. Therefore, we may speak of inductance as a negative capacitance. For convenience, we will refer to such inductance as a negative capacitance.

The servomechanism 16b illustrated in FIGS. 3 and 4 is used to synchronize the movement of the adjustable piston 33 with the frequencies produced by the intermediate source 24 for maintaining a resonant condition at all bandwidth frequencies between $f_{min}$ and $f_{max}$. See the discussion under the third and fourth embodiments for a detailed description of the servomechanism's operation.

The table below provides the maximum length required for the capacitor cavity 34 to produce a resonant condition at a $f_{min} = 50$ Hz in different bandwidth ranges and employing either a continuous or jump method for varying the capacitance to produce the resonant capacitance. Note that $v_c$, the velocity of the tube wave in the capacitor cavity 34, varies with the composition of the fluid contained in the cavity. Furthermore, by optimizing the design of the Helmholtz resonator 72, 76 the total length of the resonator can be about two to four times less than the maximum length required for a simple capacitor cavity 34. The extent of the compactness for the Helmholtz resonator 72, 76 will depend on the specific design details for the resonator 72, 76.

Maximum Effective Lengths for Various Fluid Compositions in
Capacitors with Minimum Frequency, $f_{min}$, of 50 Hertz

| Capacitor/Resonator Fluid Composition | Frequency Bandwidth Range | Method of Varying the Capacitance | $v_c$ (meters/sec) | Simple Capacitor, Maximum $\ell_1$ (meters) |
|---|---|---|---|---|
| Nitrogen (N$_2$) | $f_{min}$ to $f_R$ | Continuous | 500 | 2.5 |
| Helium (He) | $f_{min}$ to $f_R$ | Continuous | 1,000 | 5 |
| Water or Oil | $f_{min}$ to $f_R$ | Continuous | 1,500 | 7.5 |
| Nitrogen (N$_2$) | $f_{min}$ to $2f_R$-$f_{min}$ | Jump | 500 | 5 |
| Helium (He) | $f_{min}$ to $2f_R$-$f_{min}$ | Jump | 1,000 | 10 |
| Water or Oil | $f_{min}$ to $2f_R$-$f_{min}$ | Jump | 1,500 | 15 |
| Nitrogen (N$_2$) | $f_{min}$ to $2f_R$-$f_{min}$ | Continuous | 500 | 7.5 |
| Helium (He) | $f_{min}$ to $2f_R$-$f_{min}$ | Continuous | 1,000 | 15 |
| Water or Oil | $f_{min}$ to $2f_R$-$f_{min}$ | Continuous | 1,500 | 22.5 |

It is should be noted that an auxiliary tank may need to be attached to the tool as an extension of the internal capacitors 32b, 36b to reduce their overall length where the compactness of the inventive apparatus is important for meeting certain borehole constraints. However, this would not be necessary for the Helmholtz resonator designs.

The preferred embodiments and mode of practicing the invention have been described. It is to be understood that the foregoing is illustrative only and that other means and techniques can be employed without departing from the true scope of the invention defined in the following claims. Additionally, the components used in the preferred embodiments may be combined to produce alternative embodiments. For example, a fifth embodiment of a synchronized acoustic source (not shown) may be constructed using one end acoustic source 22 or 26 (as shown in FIGS. 1 and 3) and one end acoustic resonator 72a or 76a (as shown in FIGS. 2 and 4). Further, such a fifth embodiment may also include one or more internal acoustic resonators 72b, 76b (as shown in FIGS. 3 and 4). Such an embodiment would therefore create a near zero acoustic pressure null at one end by establishing a destructive interference condition between the intermediate source and at the other end by establishing a near zero impedance condition.

What I claim is:

1. An apparatus for generating seismic waves in a borehole, said apparatus having first and second spaced-apart longitudinal ends, said apparatus comprising:
    a) at least one intermediate acoustic source having an input impedance for generating acoustic pressure waves in said borehole, each said acoustic pressure wave having a corresponding acoustic pressure amplitude and acoustic current, said intermediate source being positioned between said longitudinal ends;
    b) first and second end means positioned, respectively, at said first and second longitudinal ends and adapted for creating at least a partial acoustic pressure null proximate said first and second longitudinal ends, wherein at least one end means is passive;
    c) at least one internal acoustic capacitor between said longitudinal ends, each said internal acoustic capacitor having a variable internal capacitor input impedance; and
    d) means for synchronizing said intermediate source acoustic pressure waves with said internal capacitor input impedance so that said intermediate source input impedance is substantially maximized.

2. The apparatus of claim 1 wherein said internal acoustic capacitor is a Helmholtz resonator.

3. The apparatus of claim 1 wherein each of said first and second end means is a passive acoustic capacitor for creating said partial acoustic pressure null.

4. The apparatus of claim 1 further comprising means for synchronizing the operation of said intermediate acoustic source with the operation of said first means wherein,
    a) said first end means is an end acoustic source for generating end source acoustic pressure waves which substantially destructively interfere with said intermediate source acoustic pressure waves thereby creating said partial acoustic pressure null proximate said first longitudinal end; and
    b) said second end means is an end acoustic capacitor for creating said partial acoustic pressure null proximate said second longitudinal end.

5. The apparatus of claim 4 wherein said end acoustic capacitor is a Helmholtz resonator having a variable capacitor input impedance.

6. The apparatus of claim 1 wherein said intermediate source input impedance is substantially maximized for each wavelength in a frequency range up to a frequency about two times the resonance frequency between said intermediate source and said internal acoustic capacitor.

7. The apparatus of claim 1 further comprising means for synchronizing the operation of said intermediate acoustic source with the operation of said first and second end means so that said acoustic pressure amplitude of at least a portion of said intermediate source acoustic pressure waves is substantially nullified proximate said first and second longitudinal ends, whereby at least a portion of said intermediate source acoustic pressure waves is not propagated through said borehole beyond said longitudinal ends and wherein said intermediate source input impedance is substantially maximized for each wavelength in a frequency range up to a frequency about two times the resonance frequency between said intermediate source and said internal acoustic capacitor.

* * * * *